(12) United States Patent
Mayer et al.

(10) Patent No.: US 12,446,912 B2
(45) Date of Patent: Oct. 21, 2025

(54) DEVICE AND METHOD FOR TREATING TISSUE

(71) Applicant: BOSONIC AG, Bern (CH)

(72) Inventors: Jörg Mayer, Niederlenz (CH); Andrè Schwery, Biberist (CH); Loïc Sottas, Lausanne (CH); Dominique Neuhaus, Zürich (CH)

(73) Assignee: BOSONIC AG, Bern (CH)

( * ) Notice: Subject to any disclaimer, the term of this patent is extended or adjusted under 35 U.S.C. 154(b) by 636 days.

(21) Appl. No.: 17/436,401

(22) PCT Filed: Mar. 9, 2020

(86) PCT No.: PCT/EP2020/056276
§ 371 (c)(1),
(2) Date: Sep. 3, 2021

(87) PCT Pub. No.: WO2020/182775
PCT Pub. Date: Sep. 17, 2020

(65) Prior Publication Data
US 2022/0142666 A1 May 12, 2022

(30) Foreign Application Priority Data
Mar. 8, 2019 (CH) .................... 00282/19

(51) Int. Cl.
A61B 17/32 (2006.01)
A61B 17/16 (2006.01)
(Continued)

(52) U.S. Cl.
CPC .. A61B 17/320068 (2013.01); A61B 17/1604 (2013.01); A61B 17/1633 (2013.01);
(Continued)

(58) Field of Classification Search
None
See application file for complete search history.

(56) References Cited

U.S. PATENT DOCUMENTS 5,318,570 A * 6/1994 Hood .................. A61B 17/8847
601/2
7,922,651 B2 * 4/2011 Yamada ............. A61B 18/1492
600/459

(Continued)

FOREIGN PATENT DOCUMENTS

CN 102843979 A 12/2012
CN 207821869 U 9/2018
(Continued)

OTHER PUBLICATIONS

Chinese Office Action dated Dec. 12, 2023, Application No. 202080019276.8; 11 pages.

Primary Examiner — Elizabeth Houston
Assistant Examiner — Jonathan A Hollm
(74) Attorney, Agent, or Firm — Rankin, Hill & Clark LLP

(57) ABSTRACT

A sonotrode includes a stem extending along a longitudinal axis and a cap configured to carry out an ablative process on tissue using mechanical oscillation. The cap has at least one portion that protrudes further in a radial direction than the stem, and the at least one portion has at least one sharp rim. A surface of the cap, which is arranged between a distal end of the stem and the sharp rim of the portion, is a concave surface and/or runs at an opening angle with respect to the stem that is equal or smaller than 90 degrees. A center of mass of the cap is on the longitudinal axis.

20 Claims, 5 Drawing Sheets

(51) Int. Cl.
    *A61B 17/00*          (2006.01)
    *B06B 1/06*           (2006.01)
    *B22F 10/28*         (2021.01)
    *B22F 10/62*         (2021.01)

(52) U.S. Cl.
    CPC   *A61B 17/1659* (2013.01); *A61B 2017/00526* (2013.01); *A61B 2017/320069* (2017.08); *A61B 2017/32007* (2017.08); *A61B 2017/320074* (2017.08); *A61B 2017/320078* (2017.08); *A61B 2017/320084* (2013.01); *A61B 2217/005* (2013.01); *B06B 1/0611* (2013.01); *B22F 10/28* (2021.01); *B22F 10/62* (2021.01)

(56) References Cited

U.S. PATENT DOCUMENTS

| | | |
|---|---|---|
| 2012/0004729 A1 | 1/2012 | Zipnick |
| 2015/0005771 A1 | 1/2015 | Voic |
| 2015/0007704 A1 | 1/2015 | Vieira |
| 2015/0119916 A1* | 4/2015 | Dietz ............... A61B 17/22004 606/169 |
| 2016/0128769 A1 | 5/2016 | Rontal et al. |
| 2017/0000513 A1* | 1/2017 | Conlon .......... A61B 17/320068 |
| 2017/0143398 A1* | 5/2017 | Young ................ A61B 17/8847 |
| 2018/0014844 A1 | 1/2018 | Conlon |

FOREIGN PATENT DOCUMENTS

| | | |
|---|---|---|
| WO | 2013/057179 | 4/2013 |
| WO | 2020/065245 | 4/2020 |

\* cited by examiner

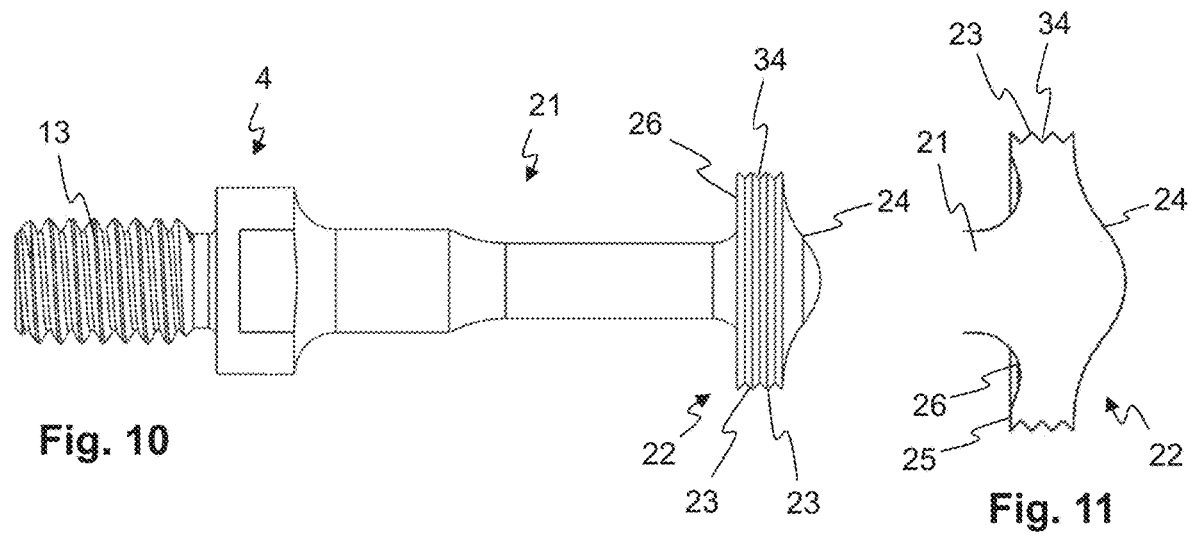
Fig. 10　Fig. 11
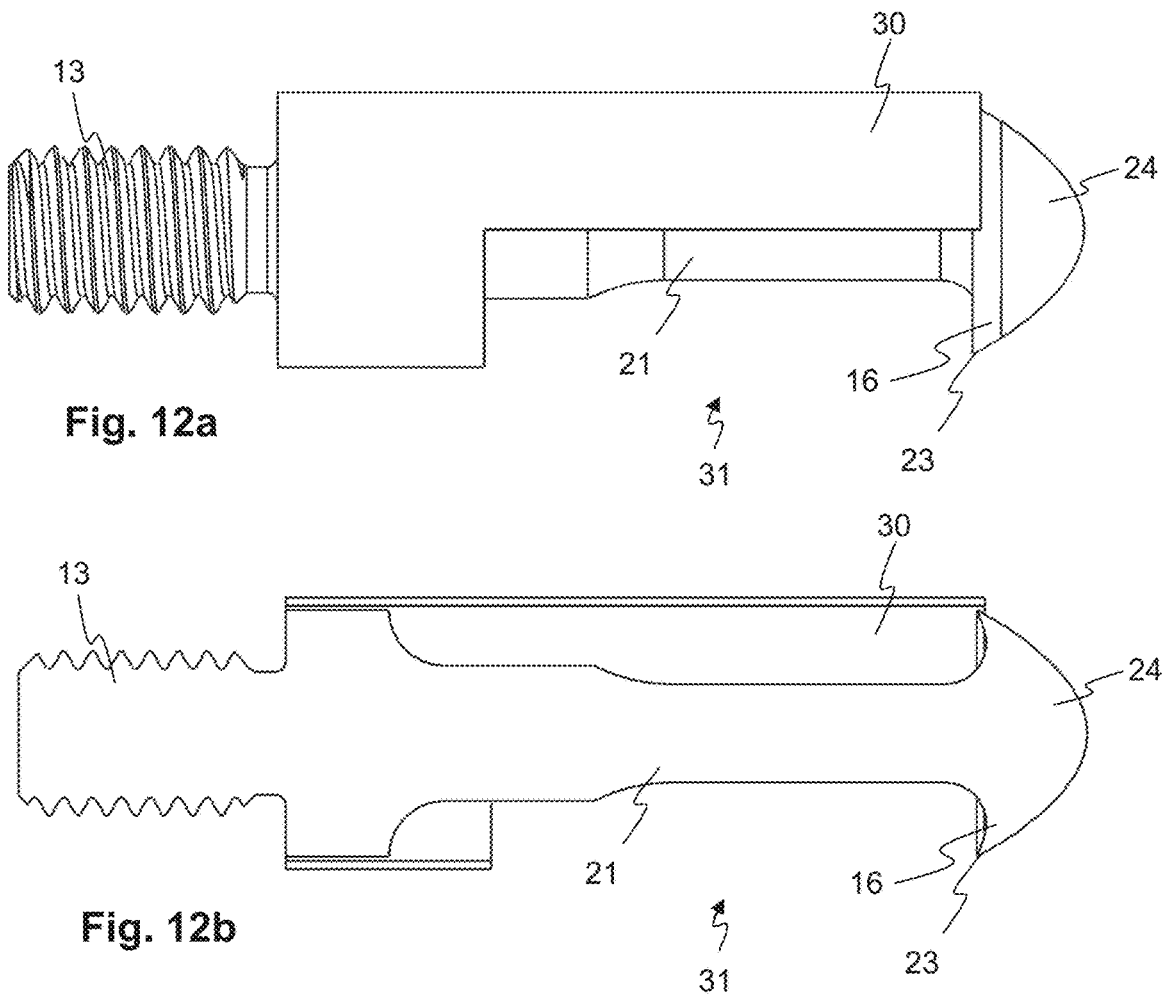
Fig. 12a
Fig. 12b

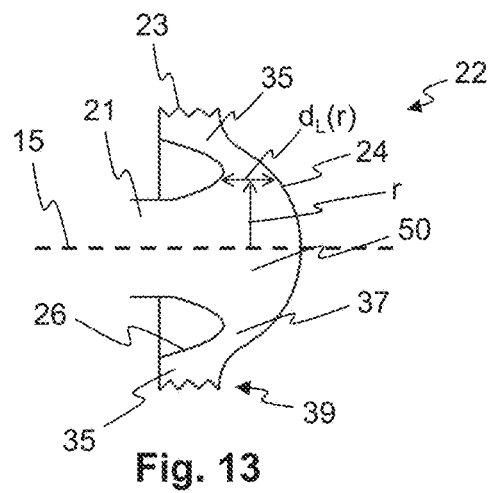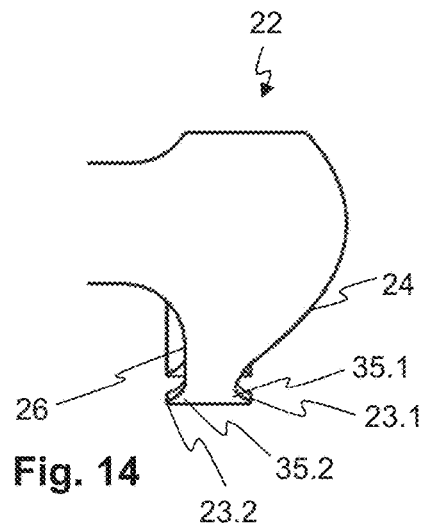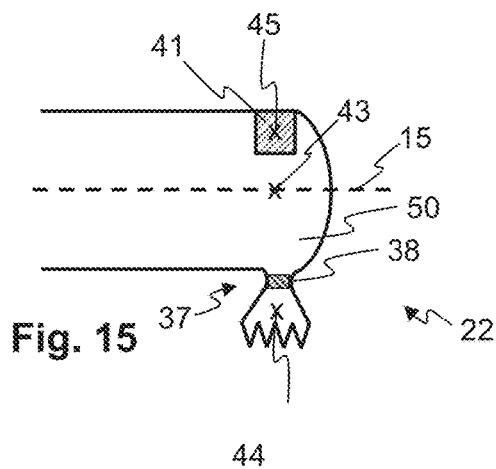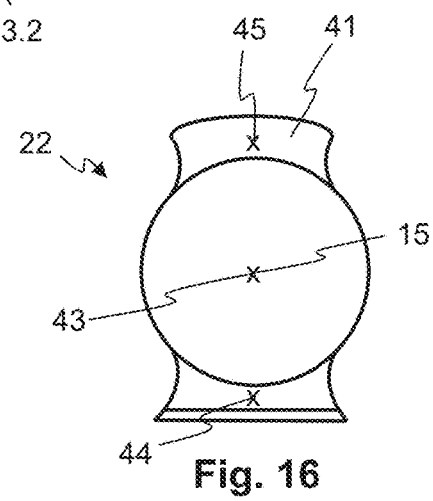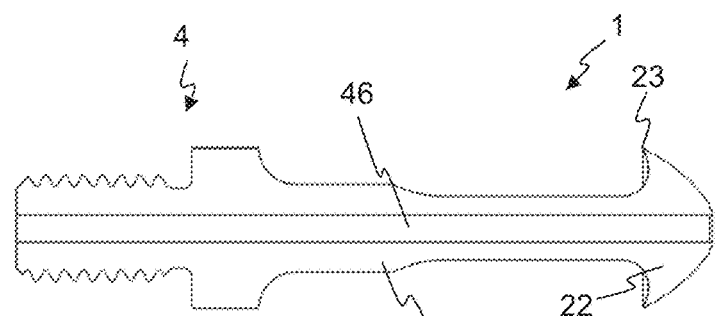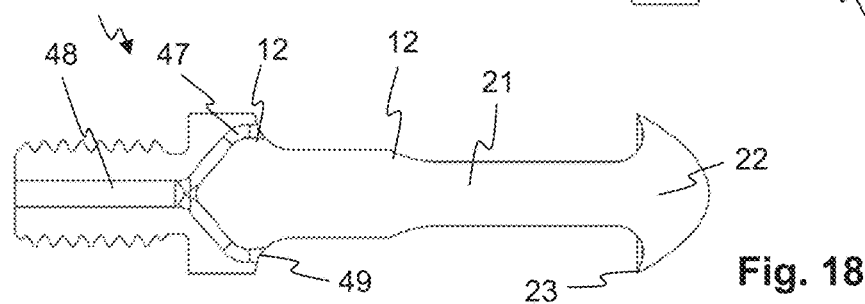

DEVICE AND METHOD FOR TREATING TISSUE

BACKGROUND OF THE INVENTION

Field of the Invention

The invention resides in the field of medical technology and concerns a device for carrying out an ablative process, such as rasping, scraping, reaming and/or cutting, on tissue. It relates in particular to a sonotrode suitable to be used with an ultrasonic surgical instrument. The tissue can be hard or soft tissue in dependence of the concrete configuration of the sonotrode.

Description of Related Art

A multitude of issues needs to be addressed for providing an ultrasonic surgical instrument in general and an element that transmits ultrasonic vibration coupled into it at one end (usually a proximal end) to a location of action (usually a distal end being in contact with the tissue). Such an element is called a sonotrode in the following. Vibration behavior, in particular when in contact with tissue, mechanical stability, in particular when a force is applied that is directed radial to a longitudinal axis of the sonotrode, restriction and/or controllability of the treatment location, applicability in cases with different and/or limited spatial conditions, ability to ablate during forward, backward and/or lateral movement, ability to rasp, scrap, ream and/or cut, transport of debris away from the treatment location as well as cooling are some of the multitude of issues.

Ultrasonic surgical instruments are used to ablate, in particular cut, soft tissue for a long time. Recent developments focus on the efficient use of ultrasonic surgical instruments for the treatment of hard tissue, in particular bone tissue.

The ultrasonic surgical devices for treating bone tissue with an ablative process, such as rasping, scraping, reaming and/or cutting, include usually a head that for the process is pressed against the bone tissue and is set into ultrasonic oscillation. The ablative process by these instruments is basically based on a local smashing of bone tissue.

Commercially available sonotrodes for ultrasonic surgical instruments for ablating bone tissue can be roughly divided in two categories. A first category concerns sonotrodes configured for cutting bone tissue in the first instance. Sonotrodes of the first category have usually a blade-like portion. A second category concerns sonotrodes configured for shaping the surface of bone tissue. Sonotrodes of the second category have usually a head that is cranked with respect to a longitudinal axis of the sonotrode and the ultrasonic surgical instrument. A sub-category of sonotrodes of the second category have a distal end including a plurality of structures that are suitable for ablation, such as spikes or edges, and that are evenly distributed around the full distal end of the sonotrode.

The osteotomy blades of the ultrasonic surgical instrument product line BoneScapel® (Misonix) and the knifes of Stryker's Bone tips are examples of sonotrodes of the first category. The BoneScapel® shavers and the Spetzlers and Payners of Stryker's bone tips are examples of sonotrodes of the second category.

Sonotrodes of the first category, this means sonotrodes for cutting bone tissue, for example in osteotomy processes, on the one hand need to be equipped to cut through very dense and strong cortical bone tissue, and this at different angles (because of different access situations). On the other hand, cutting devices need to be capable of cutting deep into for example cancellous bone tissue. That's why such sonotrodes are blade-like with a blade length that is usually between 10 and 25 mm, with a blade width that is usually between 5 and 10 mm and a blade thickness that is usually between 0.5 and 1 mm. Cutting is us usually carried out along the sidewall of the blade if the blade is considered to be constituted by two flat surfaces and a circumferential sidewall. In embodiments, the flat surfaces include structures for rasping bone tissue.

An advantage of prior art instruments including a cutting and optionally rasping head with a blade-like portion is their applicability in treatment regions that are restricted to a certain extent. A main disadvantage of said instruments is their susceptibility for deformations and/or lateral deflection effected by mechanical forces or resonances of the blade-like portion. This susceptibility for deformations limits the pressing force that can be applied between the head and the bone tissue, for example.

Sonotrodes of the second category, this means sonotrodes for shaping the surface of bone tissue, are equipped for providing a well-defined contact surface to the bone tissue to be treated. The contact surface extends significantly in two directions (axial and lateral) and has a minimal surface area of a few $mm^2$. The contact surface includes ablative structures and protrudes from the rest of the sonotrode, usually by being part of a sonotrode portion that is cranked with respect to the rest of the sonotrode. Sonotrodes of this kind are disadvantageous in terms of the excitation of lateral resonances, of restrictions concerning their working direction, of transport of debris away from the treatment location and of cooling.

Some of these disadvantages of sonotrodes of the second category may be solved by distributing ablative structures evenly around the full distal end of the sonotrode (sub-category mentioned above). However, this causes further disadvantages such as a reduced restriction and controllability of the location of action and the applicability in cases with different and/or limited spatial conditions, for example due to the risk to damage tissue that should not be treated.

WO 2013/057179 discloses a sonotrode for a surgical instrument for cutting bone tissue. The sonotrode head is blade-like and serves as cutting device extending in a longitudinal direction. It has a plurality of perforations extending in transverse direction through the sonotrode head. The perforations have an oblong shape and are at an angle between 30° and 80° to the longitudinal direction, whereby the sonotrode head gains an elasticity and, when subject to the ultrasonic vibrations, makes a pitching motion in the plane defined by the sonotrode head. According to WO 2013/057179, nevertheless a sufficient stiffness for applying a pressing force is preserved. The cutting surface of the sonotrode head further includes indentations that assist a removal of dissolved bone material.

US 2015/0005771 A1 describes sonotrodes for cutting tissue such as cartilage and bone. The sonotrodes have a planar blade body, wherein the blade body has two lateral sides and a shallow recess. These sonotrodes have a shank with an outlet communicating with the recess, thereby enabling liquid flow into the recess. The blade also has a through hole extending between the lateral surfaces of the blade body and enabling liquid flow from the recess to an opposing side of the blade.

US 2012/0004729 A1 describes cutting instruments with a longitudinal blade having a cutting edge built by a rim around an opening extending through the blade. The cutting takes place by rotation not by oscillation.

SUMMARY OF THE INVENTION

It is an object of the invention to develop further sonotrodes for an ultrasonic surgical instrument. In particular, it is an object of the invention to provide a sonotrode for an ultrasonic surgical device that meets a plurality of requirements in a better manner that state-of-the-art sonotrodes.

It is a further object of the invention to provide a related ultrasonic surgical instrument.

It is an object of the present invention to provide an improved sonotrode for an ultrasonic surgical instrument suitable for ablating hard or soft tissue.

It is a further object of the invention to provide an improved sonotrode for an ultrasonic surgical instrument suitable for ablating bones, in particular for rasping bones, using mechanical vibration as well as an ultrasonic surgical instrument for at least one of rasping bones in forward and/or backward direction, scrapping bone, in particular scrapping in backward direction, and reaming bones, in particular reaming bone in forward direction, as well as an ultrasonic surgical instrument including an improved sonotrode and related methods for ablating bone and methods for manufacturing these sonotrodes.

The sonotrode can be used for ablating cortical bone, uncontrolled growing bone, for example induced in the course of degenerative diseases like osseophytes, sclerotic bone changes, and bone tumor, for example.

The sonotrode can also be used for debridement of tumor tissue in bone and of infected sites, for example.

One goal to be achieved by the improved sonotrodes is a better ablating, in particular rasping, scrapping and/or reaming, performance for cortical bone. Cortical bone is dense and compact. Thereby the reduction of heat produced during ablating of bones is envisaged. In addition, it would be favorable to be able to improve the controllability of the ablating location.

It is yet a further object of the invention to provide an improved sonotrode for an ultrasonic surgical instrument suitable for the treatment of soft tissue by ablation using mechanical vibration as well as an ultrasonic surgical instrument for at least one of abrading soft tissue in forward and/or backward direction, as well as an ultrasonic surgical instrument including an improved sonotrode and related methods for ablating soft tissue and methods for manufacturing these sonotrodes.

Wound treatment, debridement and abrading (scrapping off) soft tissue are example of treatments that may be carried out by the improved sonotrode, the related ultrasonic surgical instrument and the related method.

The improvements to the sonotrodes are in such a way that sonotrodes that are improved according to the present invention can be used not only in open surgical procedure but also in Minimal Invasive Surgery (MIS).

The term "proximal" as used herein refers to the nearest to the point of attachment to the housing of an ultrasonic surgical instrument or respectively to the user of that instrument. The term "distal" as used herein refers to being situated away from the point of attachment to the housing of an ultrasonic surgical instrument or respectively to the user of that instrument. Thus, the distal end and the proximal end are opposite ends.

The term "sharp rim" as used herein refers to a structure such as a rim, an edge, a protrusion and the like, said structure being configured for ablating tissue. This implies not only the structural feature of being "sharp" to some extent, but also a certain arrangement of the "sharp rim" in the sonotrode. Namely, the sharp rim is arranged in a manner that it comes into contact with the tissue during a proper use of the sonotrode and the ultrasonic surgical instrument, respectively.

The term "longitudinal axis" is used herein for a central longitudinal axis.

The term "ablating" includes "rasping", "scraping, "shaping", "trimming", "forming" etc., of a tissue surface, such as the surface of bone, ligaments and tumor tissue, but also of tissue replacement material and implants.

The term "sonotrode" is used for a tool for treating tissue, in particular for treating mechanically tissue, by use of mechanical vibrations (mechanical oscillations). The sonotrode is configured to transmit mechanical vibrations that are coupled into a proximal end of the tool to its distal end, this means to a working head (the "cap" if the nomenclature of a sonotrode according to the invention is used) and to transmit the energy carried by the mechanical vibrations from the head to the tissue. Usually, the sonotrode can be excited resonantly, this means that there are frequencies of the mechanical vibrations at which the sonotrode is excited resonantly.

The terms "concave" and "convex" are used in this text also for surfaces and shapes that are "concave" or "convex" in the restrictive meanings of these terms (i.e. any straight line between two points on the concave surface runs outside of the body defining the concave surface, any straight line between two points on the convex surface runs inside of the body defining the convex surface) but that may also include straight portions.

A first aspect of the invention relates to a sonotrode for an ultrasonic surgical instrument. The sonotrode includes a longitudinal axis, a stem extending along the longitudinal axis, and a cap.

The stem may include any portion of the sonotrode arranged between a distal coupling element and the cap.

The stem may be flexible.

The stem can have a constant diameter or it can have a diameter that changes along the longitudinal axis, such as the tapering (flattening) region discussed above.

The cap is configured to carry out an ablative process on tissue using mechanical oscillation (mechanical vibration), in particular by including at least one sharp rim. The tissue can be hard tissue, in particular bone, or soft tissue. In an embodiment, the tissue is bone tissue.

The sharp rim is arranged on the cap in a manner that it can be set in contact with the tissue and that it "rasps" over its surface when mechanical vibrations along the longitudinal axis are applied to the sonotrode. In other words, the cap includes at least one portion that protrudes further in a radial direction (radial with respect to the longitudinal axis) than the stem, wherein the at least one portion includes the at least one sharp rim.

The cap includes further a surface that is arranged between a distal end of the stem and the sharp rim of the portion. In other words, the cap includes a surface, in particular a proximal surface, that extends from the onset of the cap at a distal end of the stem to the sharp rim.

The surface of the cap is a concave surface and/or it runs at an opening angle with respect to the stem that is equal or smaller than 90 degrees. An opening angle with respect to the stem of 90 degrees or smaller means that the surface has a surface normal in direction of the longitudinal axis or that the surface runs from its onset at the distal end of the stem towards proximally.

Finally, the cap is designed to have a center of mass on the longitudinal axis.

A sonotrode that has the above-named features distinguishes from state-of-the-art sonotrodes, in particular of sonotrodes of the first and second category, at least in the proximal surface that is a concave surface or that runs at an opening angle with respect to the stem that is equal or smaller than 90 degrees and/or the cap having a center of mass that is on the longitudinal axis.

These features cause various advantages, for example:

The cap having its center of mass on the longitudinal axis reduces the excitation of transversal modes when mechanical vibrations (mechanical oscillations) along the longitudinal axis are applied. In other words, the excitation of the axial vibration mode that is used during operation of the sonotrode is more efficient and the excitation of unwanted transversal side-modes is suppressed. This means that the axial working mode is more stable and the ultrasonic surgical instrument including a sonotrode according to the invention is more efficient and easier to operate.

The shape of proximal surface and the resulting overall shape of the cap simplify the transport of debris towards proximally because the cap provides a kind of shovel. The shovel is arranged immediately adjacent to the sharp rim. This is in particular advantageous if the sonotrode is operated in backward movement, this means in a movement towards proximally.

The more the proximal surface is bent or oriented towards proximally the more pronounced are the transport benefits.

The shape of the proximal surface and the resulting overall shape of the cap, in particular if it forms an overhang as disclosed below and/or if designed to support an oscillation mode of the cap as disclosed below, favors the existence of oscillation modes of the cap that can be excited by vibrations along the longitudinal axis and coupled into the cap via the stem. In particular, it favors the existence of oscillation modes having their maximum in amplitude at the most radial portion of the cap, this means at the sharp rim. This means that the sharp rim can carry out an oscillation that superimposes the oscillation of the cap along the longitudinal axis caused by the sonotrode being coupled to a transducer that carries out a back-and-forth movement along the longitudinal axis.

The oscillation of the sharp rim that superimposes the oscillation of the cap along the longitudinal axis can improve the ablation of tissue by having an oscillation axis parallel to the longitudinal axis or by having a component in radial direction.

In an embodiment, the cap includes its center of mass on the longitudinal axis by being mirror symmetric with respect to each portion that protrudes further in a radial direction than the stem (protruding portion in the following). In other words, the cap includes an imaginary mirror plane for each protruding portion, wherein the cap is mirror symmetric with respect to said imaginary mirror plane.

The cap can have an n-fold rotational symmetry with respect to the longitudinal axis, wherein n is an integer but not 1.

In an embodiment in which the above named advantages are even more pronounced, the surface of the cap that is arranged between a distal end of the stem and the sharp rim of the protruding portion is a concave surface that is bent in proximal direction to an extent that the protruding portion includes an overhang.

In other words, the surface includes a region that is arranged more proximally than an adjacent region that is along a radial direction closer to the longitudinal axis than said region.

In an embodiment, said region that is arranged more proximally is the most radial region of the protruding portion. In particular, the sharp rim (or the most proximal sharp rim as the case may be) is the most proximal portion of the overhang.

Even in other words, the surface of the cap that is arranged between a distal end of the stem and the sharp rim of the protruding portion is a concave surface that is bent in proximal direction to an extent that the protruding portion includes an undercut with respect to a radial direction.

In an embodiment, the cap is designed to include at least one oscillation mode that can be excited by mechanical oscillations, in particular along the longitudinal axis, coupled into the cap via the stem. The at least one oscillation mode of the cap is usually in addition to the oscillation mode of the sonotrode along its longitudinal axis. However, the at least one oscillation mode of the cap can be excited by said oscillation mode of the sonotrode.

In other words, the cap is designed to support an oscillation mode of the cap that superimposes the oscillation mode of the sonotrode.

In the ultrasonic surgical instrument, the oscillation mode of the sonotrode is caused by a transducer to which the sonotrode is coupled.

For example, the sonotrode can be designed according to at least one of the following design rules for having a cap that includes at least one oscillation mode that can be excited by mechanical vibrations coupled into the cap via the stem:

A diameter of the stem in a region adjacent to the onset of the cap is at most half of a related diameter of the cap. In other words, the ratio between said diameter of the stem, $d_S$, is and said diameter of the cap, $d_C$, is smaller or equal 0.5, $d_S/d_C \leq 0.5$.

A related diameter is a diameter along a radial axis that is parallel to the radial axis along which the diameter of the stem is measured.

Preferably, the ratio of diameters is valid for at least one range of radial angles (direction). For example, the range of radial angles can be larger than 45, 60, 90, 120, 135, 160, and 180 degrees.

The cap can include a plurality of ranges of radial angles in which the ratio is fulfilled.

The ratio can be fulfilled in any radial direction, this means the range of radial angles is 360 degrees.

As a rule, the probability to have a cap with a significant oscillation mode is enhanced if the ratio is smaller than 0.5, for example smaller than 0.4, ⅓, 0.3, 0.25, 0.2 or 0.1. This also means that it is in principle possible to design a cap with a significant oscillation mode of the ratio is larger than 0.5 but smaller than 1, $d_S/d_C<1$.

The larges possible circle that can be arranged completely within a cross-section of the stem, the cross-section being perpendicular to the longitudinal axis and being in a region of the stem adjacent to the onset of the cap, has a diameter that is at most half the diameter of the smallest possible circle that can enclose the cap in a cross-section perpendicular to the longitudinal axis, wherein the cross section is at the position of maximal lateral extension of the cap.

Again, the probability to have a cap with a significant oscillation mode is enhanced if the ratio is smaller than 0.5, for example smaller than 0.4, ⅓, 0.3, 0.25, 0.2 or 0.1. This also means that it is in principle possible to design a cap with a significant oscillation mode of the ratio is larger than 0.5 but smaller than 1.

In an embodiment, the inscribed circle of the stem in a cross-section perpendicular to the longitudinal axis and in a region of the stem adjacent to the onset of the cap has a diameter that is at most half of the diameter of the outer circle of the cap in a cross-section perpendicular to the longitudinal axis and at the position of maximal lateral extension of the cap.

The ratio between the diameter of the inscribed circle and the diameter of the outer circle can be as the ratios given above.

A maximal extension, $d_L$, of the cap in longitudinal direction is at most half of the maximal extension, $d_R$, of the portion that protrudes further in radial direction than the stem, $d_L/d_R \leq 0.5$.

In other words, the ratio between the maximal extension of cap in longitudinal direction and the maximal extension of the cap in a radial direction is smaller or equal to 0.5, for example 0.4, ⅓, 0.3, 0.25, 0.2 or 0.1.

The longitudinal extension of the cap depends on the distance from the longitudinal axis, wherein the longitudinal extension includes a minimum between the longitudinal axis and the sharp rim.

The cap can include a radial portion that includes an oscillation mode that superimposes the oscillation mode of the sonotrode if the longitudinal extension of the cap includes a minimum between the longitudinal axis and the sharp rim. This is in particular true if the radial portion is restricted to a limited range of radial angles (direction).

The embodiments of the cap including segments as discussed below are examples of caps that may include radial portions arranged radially of a minimal longitudinal extension of the segment and that are restricted to a limited range of radial angles.

In an embodiment, the cap includes at least one region including the sharp rim and being connected to a body of the cap via a region of the cap of reduced mechanical stability.

The reduced mechanical stability can be such that the region of reduced mechanical stability can be deformed elastically by mechanical oscillations applied to the body of the cap. The mechanical oscillation of the body of the cap are usually part of the longitudinal oscillation of the sonotrode.

The region of reduced mechanical stability can include or be an elastic element.

The region including the sharp rim and being connected to the body of the cap via the region of the cap of reduced mechanical stability can be considered as an oscillator that is in addition to oscillator defined by the whole sonotrode and optionally in addition to the oscillator defined by the whole cap (if able to support an oscillation mode) and optionally in addition to an oscillator defined by the body of the cap (if able to support an oscillation mode). In other words, the region can be seen as a separate oscillator.

In an embodiment, the sonotrode is designed for maximal vibrational excitation of the cap.

This can be done by the sonotrode including a coupling element for being coupled to a transducer. The coupling can be a direct coupling to the transducer. However, the coupling is usually an indirect coupling via an intermediate sonotrode, this means a sonotrode arranged between the transducer and the sonotrode according to the invention.

The coupling element is usually arranged at a distal end of the sonotrode. The coupling element can be of any kind suitable for a mechanical firm connection that is capable to transmit mechanical vibrations, in particular ultrasonic vibrations, from the transducer or intermediate sonotrode to the sonotrode. For example, the coupling element can include a thread, an element of a bayonet connection or an element of a clamping mechanism.

The sonotrode can have a coupling element without being designed for maximal vibration excitation of the cap.

The sonotrode can be designed for maximal vibrational excitation of the cap by being optimized for a preset frequency of mechanical oscillations, this means a preset operation frequency, and by having a distance, d, between the coupling element and the cap being essentially half of the wavelength, $\lambda$, of the preset frequency or a multiple of half of the wavelength of the preset frequency, this means $d=n*\lambda/2$, wherein n is an integer.

The distance d can be distance between the coupling element, in particular the surface of the sonotrode being designed for being put in contact with the transducer, and the center of mass of the cap or the onset of the cap.

In an embodiment, the cap includes a convex surface.

The convex surface can be designed in a manner that the overall shape of the cap is similar to the hat of a mushroom. This may be in particular true for embodiments in which the cap includes the concave surface in any embodiment disclosed above or the surface that runs at an opening angle with respect to the stem that is equal or smaller than 90 degrees.

In an embodiment, the convex surface may be formed as a hat of a mushroom.

The convex surface may be configured to provide a soft and/or smooth surface on a distal surface of the cap.

If it is the main purpose of the sonotrode to avoid damages of tissue close to the treatment location, the convex surface, or more general a convex shape, of the cap may be its characteristic feature. In this case, other features of the sonotrode disclosed above, such as the position of the center of mass of the cap and the shape and/or orientation of the surface that is arranged between a distal end of the stem and the sharp rim, can be absent.

In other words, the invention—as a kind of a secondary aspect—also relates to a sonotrode for an ultrasonic surgical instrument, the sonotrode having a proximal head and a distal end piece, the distal end piece being equipped as a stem and a cap for ablating tissue, in particular bones, using mechanical vibration. In other words, the distal end piece includes a stem and a cap for ablating tissue using mechanical vibration. The sonotrode is configured to avoid damages of tissue close to the treatment location by the cap including a convex shape and at least one sharp rim, wherein the convex shape is configured to provide a soft and/or smooth surface on one side of the distal end piece.

In other words, the soft and/or smooth surface is configured to prevent the sonotrode from ablating and/or any further harmful influence in at least one direction.

In embodiments, the sonotrode for avoiding damages of tissue can include any of the features disclosed with respect to the sonotrode according to the main aspect of the invention alone or in combination. In particular, the cap can include a center of mass that is on the longitudinal axis and the shape and/or orientation of the surface that is arranged between a distal end of the stem and the sharp rim can be as disclosed above.

Whereas the soft and/or smooth surface is essential for the sonotrode for avoiding damages, the sonotrode according to the main aspect of the invention may include the convex surface. However, the convex surface may include structures for rasping. The structure can be given by the surface roughness of the convex surface or by a plurality of sharp elements arranged on the convex surface.

The portion that protrudes further in radial direction can be defined as follows: the stem extends in radial direction with respect to the longitudinal axis up to a maximal distance from the longitudinal axis and the portion has a radial extension with respect to the longitudinal axis that is larger than the maximal distance.

In embodiments, the portion has over a range of radial angles a radial extension that is larger than the maximal distance. This means, the portion extends over a range of radial directions radially further than the maximal distance. The radial direction along which the maximal distance is arranged may but does not need to be comprised by the range of radial directions.

The range of radial angles can be larger than 10 degrees, in particular larger than 20 degrees, for example larger than 45, 60, 90, 120, 135, 160, and 180 degrees. In particular, the range of radial angles is such that the sonotrode is not blade-like or does not include a blade-like portion because it includes the cap with the portion having over the range of radial angles the radial extension that is larger than the maximal distance.

The cap can include at least two, for example 2, 3 or 4, portions that protrude further in radial direction than the stem, this means that have over a range of radial angles the radial extension that is larger than the maximal distance, this means the maximal radial extension of the stem.

The portion of the cap that extends radially further than the stem can extend in any radial direction further than the stem. In other words, the range of radial angles over which the portion extends radially further than the stem can be 360 degrees.

In any embodiment, the portion of the cap that extends radially further than the stem may include a contact site equipped for being in contact with the tissue during usage of the sonotrode and the contact site may include the sharp rim.

In any embodiment, the portion of the cap that extends radially further than the stem may include the sharp rim.

In an embodiment, the sharp rim is formed by at least one of:

The cap includes the convex surface, wherein the convex surface is distally facing, and the sharp rim is formed by a transition from the convex surface to the surface that is concave or that runs at an opening angle with respect to the stem that is equal or smaller than 90 degrees.

A transition from a first surface that is flat, concave or convex to a second surface that is flat, concave or convex, wherein the first and second surfaces are oriented differently.

The flat surface or—as the case may be—one of the flat surfaces may be the surface that runs at an opening angle with respect to the stem that is equal or smaller than 90 degrees, in particular its radial end portion.

The concave surface or—as the case may be—one of the concave surfaces may be the concave surface that is arranged between a distal end of the stem and the sharp rim, in particular its radial end portion.

The convex surface or—as the case may be—one of the convex surfaces may be the distally facing convex surface, in particular its radial end portion.

A protrusion or protrusions of the convex surface, of the concave surface that is arranged between a distal end of the stem and the sharp rim, or of the surface that runs at an opening angle with respect to the stem that is equal or smaller than 90 degrees, in particular a protrusion or protrusions that are arranged at radial end portion of the surfaces.

For example, the cap can be mushroom-like by including the distally facing convex surface and the proximally facing concave surface. Then, the sharp rim can be formed by the transition from the distally facing convex surface to the proximally facing concave surface.

Independent of the concrete realization of the cap, the sharp rim (or sharp rims, as the case may be) can be arranged on the portion of the cap that protrudes radially further than the stem.

In an embodiment and independent of the concrete realization of the cap, the sharp rim(s) can be arranged on a radially outmost portion of the cap, for example of the mushroom-like cap. In other words, the rim is arranged on or formed by a portion of the cap that has a distance to the longitudinal axis that is larger than any other portion of the cap, wherein the distance to the longitudinal axis is measured along a radial direction (radial with respect to the longitudinal axis).

Independent of the concrete realization of the cap, the sharp rim (s) can be rotationally symmetric with respect to a rotation around the longitudinal axis. For example, the sharp rim can have the shape of a circle having its center on the longitudinal axis.

In an embodiment and independent of the concrete realization of the cap, the sharp rim can be formed by a plurality (this means at least two) rim elements.

The rim elements can be separated by recesses, in particular by recesses that extend in radial direction towards the longitudinal axis.

The rim elements can be arranged in a manner that they are rotationally symmetric with respect to a rotation around the longitudinal axis. This means that a rotation of the cap around the longitudinal axis by 360°/n, wherein n is an integer, is a symmetry transformation of the cap. The number of rim elements can be n. However, one can envisage embodiments, where the number of rim elements is different from n, for example by including rim elements of different kinds and by arranging the different rim elements in a set order.

Alternatively, the sharp rim or the rim elements can be arranged in a manner that the sharp rim is not rotationally symmetric with respect to the longitudinal axis.

However, the overall shape of the cap has to be chosen in a manner that the requirement of a center of mass of the cap that is on the longitudinal axis is fulfilled, at least as far as it concerns sonotrodes according to the main aspect of the invention. This can be done by choosing the number, kinds and arrangement of rim accordingly or by the use of an equalizing weight.

In an embodiment, the sharp rim or rim elements can be arranged in a segment, only. This means that the sharp rim or rim elements can be arranged within a limited range of radial directions (a limited range of radial angles), only. For example, the arrangement of the sharp rim or rim elements can be restricted to a region of the sonotrode that is configured for ablating during use of the sonotrode.

Again, the overall shape of the cap has to be chosen in a manner that the requirement of a center of mass of the cap that is on the longitudinal axis is fulfilled, at least as far as it concerns sonotrodes according to the main aspect of the invention.

The rim or rim elements can be arranged to limit the contact site.

The rim or rim elements can be arranged in an application specific manner. For example, the rim or rim elements can be arranged to treat a specific bone, a specific portion of a bone, or to treat or establish a specific cut of or in a bone. In addition or alternatively, the rim or rim elements can be arranged to localize the treatment region, this means to improve the controllability of the treated region, for example by restricting the contact site and/or by restricting the sharp rim within the contact site.

For example, the rim or rim elements can be arranged to treat a specific bone, a specific portion of a bone, or a specific cut of or in a bone without rotating the sonotrode and/or the ultrasonic surgical instrument around its longitudinal axis.

For example, the rim or rim elements can be arranged within a range of radial angles below 90 degrees for the treatment along an essentially flat bone surface, for establishing a well-defined recess with a small width, or for cuts of small bones etc. The range of radial angles can be between 90 and 180 degrees for treatment along a bone surface that is bent between 1 and 90 degrees, wherein the range of radial angles is preferably close to 90 degrees if there is a bent close to 1 degree and the range of radial angles is preferably close to 180 degrees if there is a bent close to 90 degree. Further a range of angles between 90 and 180 degrees can be used to establish a recess with larger width (compared to the width established by smaller ranges of radial angles) or to cut larger (in particular wider) bones (compared to the bones that can be cut with smaller ranges of radial angles), for example. Consequently, the rim or rim elements can be arranged within a range of radial angles of more than 180 degrees for bone surfaces that are curved by more than 90 degrees, for even larger recesses or for cutting even larger (wider) bones, for example. In other words, the range of radial angles can be adapted to the shape of the bone to be treated, to the form of the recess to be established and/or to the dimensions of the bone to be cut, for example.

The rim or rim elements can be arranged in a plurality of segments, this means in at least two ranges of radial angles, wherein the two ranges are separated by a region not including a rim or rim element.

For example, the segments can be separated by recesses, in particular by recesses that extend in radial direction towards the longitudinal axis and/or by a segment that is not configured for ablating tissue.

A circumferential surface of the cap can be adapted to the desired locations of the sharp rim or rim elements.

The circumferential surface can be formed by portions that have a radial extension that is larger than the maximal distance and by portions that have a radial extension that is smaller than the maximal distance. The circumferential surface can have the same symmetry properties as the sharp rim or the rim elements.

In an embodiment, the sonotrode includes at least two sharp rims according to any embodiment of the sharp rim described above, wherein the at least two sharp rims are offset along a proximal-to-distal direction. In other words, the at least two sharp rims are offset along the longitudinal direction of the sonotrode.

For example, the at least two sharp rims can be arranged in a manner that the sharp rims are arranged mirror symmetrical with respect to a mirror plane having a normal parallel to the longitudinal axis.

Such an arrangement of the at least two sharp rims is in particular advantageous if the cap includes at least one oscillation mode that can be excited by longitudinal oscillations of the stem and that has its maximal amplitude in the region of the at least two sharp rims and/or if the cap includes at least one region including the at least two sharp rims and being connected to a body of the cap via a region of the cap of reduced mechanical stability such that the region including the sharp rims includes its own ("self-reliant") oscillatory behavior. In these cases, the cap (the region including the at least two sharp rims as the case may be) may include an oscillatory mode that can be excited by a longitudinal oscillation of the stem and in which the at least two sharp rims oscillate predominantly in proximal-to-distal direction.

The at least two sharp rims can be offset in radial direction (radial with respect to the longitudinal axis).

For example, the circumferential surface of the cap can include a surface having a surface normal that coincides essentially with a radial direction (radial with respect to the longitudinal axis). The surface can be a portion of an imagined surface surrounding the longitudinal axis, wherein each point on that imagined surface has the same distance from the longitudinal axis. The surface can be a surface surrounding the longitudinal axis, wherein each point on that surface has the same distance from the longitudinal axis.

Then, a transition from the surface to a surface of the cap having a surface normal with at least a component directed towards distally can form a first sharp rim and a transition from the surface to a surface of the cap having a surface normal with at least a component directed towards proximally can form a second sharp rim.

Alternatively or in addition, the cap can include at least one step having a radial distance from the longitudinal axis that is larger or smaller than a radial distances of an adjacent surface of the cap. The adjacent surface of the cap can be formed by the convex surface, a flat surface, a concave surface or another step for example.

For example, the cap can include along the distal-to-proximal direction a first step that increases the distance of the circumferential surface of the cap from the longitudinal axis with respect to the convex surface, at least one further step that increases the distance of the circumferential surface of the cap with respect to the first step, and a transition from the most proximal step to a surface of the cap that is oriented towards proximally.

A sonotrode with a cap including the circumferential surface having a surface normal that coincides essentially with a radial direction in any embodiment described above and that is serrated is another example of a sonotrode including at least two sharp rims.

It goes without saying that the various realizations of the sharp rim can be combined in any manner to design a sonotrode having at least two sharp rims.

A sonotrode having at least two sharp rims has the advantage that it ablates when the sonotrode is moved in distal direction during use of the sonotrode and when the sonotrode is moved in proximal direction during use of the sonotrode if at least one of the sharp rims is configured in a manner that it ablates when the sonotrode is moved in a distal direction during use and at least one of the sharp rims is configured in a manner that it ablates when the sonotrode is moved in a proximal direction.

Hence, the invention relates to a sonotrode according to any embodiment disclosed and having further at least two sharp rims that can be realized according to any embodiment disclosed above, where at least one of the sharp rims is configured in a manner that it ablates when the sonotrode is moved in a distal direction during use and at least one of the sharp rims is configured in a manner that it ablates when the sonotrode is moved in a proximal direction.

Further, a plurality of sharp rims extends the application possibilities of the sonotrode in particular to cases in which the tissue, for example bone, to be treated is curved—as it is the case with vertebrae, hip bones, shoulder bones and many other bones or regions of bones.

The inventors could observe that the removal of splinters or debris (debris of the hard or soft tissue treated) can alternatively be promoted by a sonotrode undertaking a nodding motion. The sonotrode then acts in the style of a shovel which removes the debris. Thus, in an embodiment, the sonotrode has a design which adds to the dominant x-amplitude of the vibration, this means to the dominant vibration along the longitudinal axis, a significant z-amplitude, this means a vibration in radial direction. This causes further that the tissue is not only ablated by pushing movements but also by movements essentially perpendicular to the pushing movements. This increases further the ablating performance and allows improved ablating of the tissue, in particular of bone, such as cortical bone.

In an embodiment, the nodding motion is a nodding motion of the radial portion that includes an oscillation mode that superimposes the oscillation mode of the sonotrode described above. In other words, the nodding motion is a nodding motion of at least one sub-portion of the cap.

The following statements or implementations relate to all aspects and embodiments described herein.

In an embodiment, a diameter of the stem can decrease in distal direction. In other words, the stem can include at least one region that tapers in distal direction.

It has been observed that a tapering region can have a boost effect, this means to an increase in amplitude and intensity of the mechanical vibration.

The sonotrode may also include a tapering region for the transition of the coupling element to the stem.

In an embodiment, the sonotrode includes a sleeve arranged or configured to be arranged around the stem in a manner that the stem is shielded from an exterior of the sleeve and that the sharp rim is exposed to a lateral direction at least.

In particular, the sleeve can be designed to surround laterally the stem, in particular the whole stem except the portion adjacent to the cap.

In an embodiment, the sonotrode includes means for providing a fluid to the treatment location and/or for removing a fluid and/or debris from the treatment location.

The fluid can be a coolant and/or irrigation fluid.

The means for providing can be a channel arranged in the sonotrode.

A sonotrode in any embodiment according to the invention can have the following dimension, for example:

The cap can have a diameter between 2 and 15 mm, for example between 2 and 6, 3 and 5 or between 3 and 4 mm for endoscopic applications and for example between 4 and 10 or between 5 and 8 mm for "open" applications.

The stem can have a diameter between 1 and 10 mm, for example between 1 and 6, 1 and 3 or between 1 and 2 mm for endoscopic applications and for example between 2 and 8 or 3 and 6 mm for "open" applications.

The portion protruding radially further than the stem can protrude further by 0.5 mm at least. For example, it can protrude further by 0.5 to 4 mm, for example by 0.5 to 2 or by 0.5 to 1 mm (endoscopic application) or by 1 to 2 mm ("open" application). In particular and independent of the application, the dimensions of the stem are chosen such that the portion protruding radially further than the stem protrudes further by 0.5 mm at least.

The longitudinal extension of the cap may be between 1 and 5 mm.

The longitudinal extension of the stem and of the whole sonotrode can be chosen to fulfill the requirements for maximal vibrational excitation of the cap disclosed above.

The exact dimensions are application specific, as indicated by the exemplary numbers given for "endoscopic" applications and "open" applications.

The inventors found that sonotrodes made by additive manufacturing methods, in particular using sintering (such as selective laser sintering) have some surprising advantages. The ultrasonic surgical instrument according to the invention is regularly equipped with a line (channel) by means of which a rinsing liquid (e.g. water) can be supplied to the operating field. The surface structure generated using the afore-mentioned method of manufacturing increases the cooling efficiency by that liquid. One explanation could be that the surface structure provides for and maintain a proper liquid film on the surface of the sonotrode. It seems that one possible effect is that pockets created by the sintering process, which are not open to the side provide for a hydrostatic cushion. In addition, only by using additive manufacturing methods it is possible to produce some of the advantageously features of sonotrodes described herein, such as elevated structures having optionally only minimal distance between each other. In addition, using additive manufacturing allows to adapt the transition between different elements of the sonotrode.

One embodiment of the present invention refers to a sonotrode, for example to a sonotrode according to any embodiment described herein, wherein a surface of the sonotrode, in particular a surface of the sonotrode arranged for being in contact with tissue during operation of the sonotrode, such as the surface forming the sharp rim and/or a distally facing surface, such as the convex surface, has convex microstructures. The microstructures are curved or rounded outward like the exterior of a sphere or circle. Another embodiment of the present invention refers to a sonotrode, for example to a sonotrode according to any embodiment described herein, wherein a surface of the sonotrode, in particular a surface of the sonotrode arranged for being in contact with tissue during operation of the sonotrode, such as the surface forming the sharp rim and/or a distally facing surface, such as the convex surface, has a roughness average $R_a$ between 1-40 µm, preferably between 5 and 15 or 20 µm. Thereby surface roughness as a component of surface texture is quantified by the deviations in the direction of the normal vector of a real surface from its ideal form. The arithmetic average roughness, $R_a$ is the arithmetic average value of filtered roughness profile determined from deviations about the center line within the evaluation length and the most widely used one-dimensional roughness parameter.

In general, it has been shown that it is advantageously that the distance between the highest point of any convex microstructure of the sonotrode and a sonotrode surface at the position of the convex microstructure is smaller than the amplitude of the oscillation. Thereby the highest point of a convex microstructure is the point of a defined hemisphere where the radius coincides with an imaginary normal of the sonotrode surface at the position of the microstructure. The average distance between two corresponding points on the convex structures (in particular the highest point of each convex structure) may be 20-100 µm, and preferably 40-80 µm.

Due to the surface roughness resulting from the sintering process there are point contacts between the cap, in particular the contact site, and the tissue. Thus, a higher energy density occurs. However, the convex surface portions which arise by the grain size distribution are more stable than for example roughness structures made by sandblasting.

Consequently, one embodiment of the present invention relates to a method for manufacturing a sonotrode as defined herein, wherein the sonotrode or a portion thereof, in particular the cap or a portion thereof, is manufactured by using additive manufacturing method. Direct Metal Laser Sintering (DMLS) is such an additive manufacturing process suitable to be used to produce the sonotrodes according to the invention. Thereby the sonotrode, in particular a surface of the sonotrode arranged for being in contact with tissue during operation of the sonotrode, such as the surface forming the sharp rim and/or a distally facing surface, such as the convex surface, is built using a laser to selectively sinter (heat and fuse) a powdered metal material into layers. Subsequently, a step of heat treatment may be carried out. It is preferred that the surface as resulted due to the additive manufacturing is not smoothed (evened or polished). The powder to be used may have an average particle diameter of 40-80 µm.

An alternative method suitable for manufacture of the sonotrode, in particular a surface of the sonotrode arranged for being in contact with tissue during operation of the sonotrode, such as the surface forming the sharp rim and/or a distally facing surface, such as the convex surface, is shot blasting or respectively shot peening. Sandblasting is less suitable. The surface structure resulting from the sintering process of metal grains cannot be entirely described by parameter such as roughness and grain size. Nevertheless, this particular surface structure has been proven to be advantageously. Therefore, the present invention refers to a sonotrode according to the invention, wherein the sonotrode or at least the cap or the contact site is manufactured using additive manufacturing method such as direct metal laser sintering. In particular, the present invention refers to a sonotrode for an ultrasonic surgical instrument, in particular a sonotrode according to any embodiment described herein, wherein the sonotrode, in particular a surface of the sonotrode arranged for being in contact with tissue during operation of the sonotrode, such as the surface forming the sharp rim and/or a distally facing surface, such as the convex surface is manufactured using an additive manufacturing method such as direct metal laser sintering. Other embodiments refers to sonotrodes being equipped or designed as described herein which are manufactured using an additive manufacturing method such as direct metal laser sintering.

For example, the surface of the sonotrode or the surface of the cap or the surface of the contact site has a roughness average $R_a$ between 5-40 µm.

In case the roughness is only used to minimize the friction, it is sufficient to have a roughness between 1 and 20 µm and in particular between 1 and 15 µm. In case the sonotrode according to the invention should be used as a file, the roughness is preferably between 10 and 100 µm. The aim of the use of a sonotrode as a file is to smooth the tissue, for example the bone, and in particular edges resulting of a cut. Mainly it is very useful as coarse bony areas can cause damage to surrounding tissue if they are not evened out with a file. However, the roughness can be even more aggressive in terms of its filing and rasping properties. For example, the roughness can be up to 500 µm, for example between 100 and 250, between 100 and 150 or between 100 and 120 µm. The surface can include well-defined structures of this size instead of a corresponding surface roughness.

The invention refers further to an ultrasonic surgical instrument for ablating tissue, including a hand-piece containing an ultrasonic transducer and a sonotrode according to any embodiment defined herein being mechanically coupled to the transducer. The term "ultrasonic surgical instrument" as used herein refers to a surgical instrument with an ultrasound transducer. This ultrasonic surgical instrument of the invention includes a sonotrode as described herein being connected to the ultrasound transducer. The ultrasound transducer may include a piezoelectric element, by means of which a high-frequency AC voltage is converted into a corresponding mechanical vibration. By way of example, the frequency of the vibration can lie between 15 kHz and 40 kHz.

Preferably, the ultrasound transducer or the housing of the ultrasonic surgical instrument of the invention and the sonotrode (via coupling element) are coupled to each other, wherein the sonotrode is designed to transmit the vibration energy as fully as possible from its proximal end to the distal end, namely to the cap.

Preferably, the material of the sonotrode according to any embodiment of the invention is a metallic material, such as, e.g., stainless steel or titanium. The sonotrode or at least the cap thereof or at least the contact site thereof may be coated with titanium nitride (TiN). Thus, the present invention refers to a sonotrode, for example a sonotrode according to any embodiment described herein, for an ultrasonic surgical instrument having a stem and a cap for ablating tissue, in particular bone, using mechanical vibration, wherein the sonotrode or at least the cap or the contact site of the sonotrode is coated with titanium nitride and is preferably manufactured using an additive manufacturing method such as direct metal laser sintering.

It has been shown that the spherical microstructures on the surface of the sonotrode or respectively the cap or respectively the contact site may be deformed caused by the forces acting during ablation of the tissue. Therefore, it is preferred to coat the sonotrode or the cap or the contact site to harden the surface. TiN has an ideal combination of hardness, toughness, adhesion and inertness, that will not blister, flake or chip during ablation of tissue.

Another advantage is an optimized distribution of heat along the length of the surface created by the TiN coating. In this manner, hot spots are avoided, and the heat distribution or dispersion along the length of the surgical cutting instrument prohibits concentration of heat at the contact site, in particular at the sharp rim, as would occur with no coating or coating only at the contact site.

The TiN coating may be applied by environmentally safe, Physical Vapor Deposition (PVD) vacuum system. Some processes use low temperature arc vapor deposition to deposit the titanium nitride coating, but it could also be applied by high temperature sputtering or other well-known coating processes (electron beam heating or chemical vapor deposition (CVD)). In general, pure titanium is sublimed and reacted with nitrogen in a high-energy, vacuum environment. TiN film may also be produced on Ti workpieces by reactive growth (for example, annealing) in a nitrogen atmosphere.

The TiN coating is preferably applied as a thin coating of less than 5 µm, more preferably of less than 3 µm. The thin titanium nitride coating provides the cap with a hard outer surface with a low coefficient of friction.

Preferably, the connection between the sonotrode and the vibration generator is releasable and the sonotrode is disposable.

The ultrasonic surgical instrument according to the invention is, e.g., a hand-held device wherein a handle portion thereof houses the vibration generator being supplied with the necessary energy by a battery or through a corresponding cable connecting the hand piece to a control and supply unit. The preferred frequency for the vibration is in the ultrasonic range, preferably in the range 15 and 40 kHz or between 20 and 30 kHz and of an energy sufficient for achieving an amplitude in the micrometer range for the distal end of the stem, between 20 and 120 μm or preferably between 40 and 100 μm or between 60 and 100 μm.

Approaches to improve the controllability and/or extension of a treatment region have been disclosed above with respect to the sonotrode, such as the sharp rim or sharp rims or rim elements being arranged in a segment or segments, only. Approaches to improve the efficiency and to avoid the excitation of unwanted oscillations have also been disclosed above.

In an embodiment, the ultrasonic surgical instrument may include a sleeve that is mounted or that can be mounted to the hand-piece and that is designed to surround laterally the stem and to let the sharp rim exposed at least to a lateral direction when the sleeve is mounted to the hand-piece and the sonotrode is connected to the ultrasonic transducer.

In other words, the sleeve defines an interior of the sleeve and an opening between the interior and an exterior of the sleeve in addition or alternatively to any embodiment of the cap configured to improve the controllability and/or extension of a treatment region. In this embodiment, the sleeve is mounted or mountable to the handle portion and it is designed in a manner that the stem and the cap according to any embodiment is shielded from the exterior except a restricted portion of the cap configured to ablate tissue when the sleeve is mounted to the handle portion and the sonotrode is connected to the ultrasonic transducer.

The sleeve, in particular its opening or its openings, can be arranged in an application specific manner. For example, the opening or openings can be arranged to treat a specific bone, a specific portion of a bone, or to treat or establish a specific cut of or in a bone. In addition or alternatively, the opening or openings can be arranged to localize the treatment region(s), this means to improve the controllability of the treated region, for example by restricting the contact site and/or by restricting the sharp rim within the contact site.

In an embodiment, the sleeve is mounted or mountable to the handle portion in a manner that it can be rotated around the longitudinal axis of the sonotrode without rotation the ultrasonic surgical instrument, in particular without rotating the handle portion.

In addition, the ultrasonic surgical instrument can include an orientation indicator configured to indicate the orientation of the opening with respect to a set direction.

The sleeve in any embodiment disclosed does not only protect the tissue from unwanted treatment. It also reduces the influence of tissue on the sonotrode. In particular, it prevents damping of the mechanical vibration due to contact of the sonotrode, for example the stem, with tissue. Further, it may reduce the lateral forces acting on the sonotrode and caused by soft tissue, for example.

A sleeve is in particular favorable for a long sonotrode, for example because its lateral extension is designed for maximal vibrational excitation of the cap, this means the lateral extension d is in the range of $d=n*\lambda/2$, wherein $\lambda$ is the wavelength of the frequency at which the sonotrode is operated and n is an integer.

Even further, the sleeve can support the supply of a coolant and/or irrigation fluid to the treatment location and/or the transport of debris away from the treatment location, for example by suction.

This embodiment of the ultrasonic surgical instrument is in particular advantageous in combination with a sonotrode that is configured to treat a larger treatment region than given by the opening. For example, the sonotrode, more precisely its cap, can have at least one sharp rim that surrounds the longitudinal axis continuously or continuously except some recesses. In other words, the sharp rim can form essentially a circle around the longitudinal axis, wherein the center of the circle is on the longitudinal axis.

The embodiment with the rotatable sleeve is advantageous for the treatment of complex tissue shapes, such as complex bone shapes, and/or for treatment areas that are difficult to access. Thereby, the treatment area can be adjusted with a minimum of manipulation on the ultrasonic surgical instrument, the treatment area is always well-defined, and the sleeve protects tissue that must not be treated.

Another aspect of the present invention refers to a method of ablating tissue. Thus, the present invention refers to a method using a sonotrode, in particular using a sonotrode according to the present invention in any embodiment disclosed, the method including the steps of: providing a sonotrode at an ultrasonic surgical instrument according to any embodiment disclosed and oscillating the cap so as to ablate (rasp, file, abrade, cut etc.) tissue.

The method can further include any step directly linked to features of the sonotrode, such as at least one of:
  Operating the ultrasonic surgical instrument in pushing and/or pulling mode;
  Operating the ultrasonic surgical instrument in a manner suitable for ablating hard tissue, in particular bone tissue, for example by operating the ultrasonic surgical instrument in a manner that an oscillation amplitude of the sharp rim is 100 μm at most, or operating the ultrasonic surgical instrument in a manner suitable for ablating soft tissue, for example by operating the ultrasonic surgical instrument in a manner that an oscillation amplitude of the sharp rim is 150 μm or more;
  Turning a sleeve of the ultrasonic surgical instrument without turning the sonotrode.

As mentioned at the very beginning, the improvements to the sonotrodes are in such a way that sonotrodes that are improved according to the present invention can be used not only in open surgical procedure but also in Minimal Invasive Surgery (MIS).

In an embodiment, a sonotrode and hence an ultrasonic surgical instrument used for MIS include:
  The stem extending along the longitudinal axis and the cap configured to carry out an ablative process on tissue using mechanical oscillation, wherein the cap includes the at least one portion that protrudes further in radial direction than the stem, wherein the at least one portion includes the at least one sharp rim. The cap includes further the surface that is arranged between the distal end of the stem and the sharp rim of the portion and that is concave and/or runs at an opening angle with respect to the stem that is equal or smaller than 90 degrees. The cap includes further its center of mass on the longitudinal axis.

The cap, the stem, the portion that protrudes further in radial direction than the stem, the sharp rim and the surface that is arranged between the distal end of the stem and the shar rim can be according to any embodiment disclosed.

The center of mass of the cap can be on the longitudinal axis due to any measures disclosed.

The stem that has a length, d, being essentially half of the wavelength of the preset frequency or a multiple of half of the wavelength of the preset frequency, $d=n*\lambda/2$, wherein n is an integer.

The length of the stem can be considered as the distance between coupling element and the cap of the straight or straightened sonotrode. The length of the stem can deviate from being $n*\lambda/2$ to some extent, for example if the sonotrode is designed for the maximal amplitude of the longitudinal oscillation being within the cap, for example at its center of mass, and not at its proximal onset. Also, the realization of the coupling element can cause the stem to deviate from $n*\lambda/2$ to some extent.

The stem has a constant diameter in many embodiments of the sonotrode configured for use in MIS.

The sleeve arranged or configured to be arranged around the stem in a manner that the stem is shielded from an exterior of the sleeve. The sleeve can be according to any embodiment disclosed above.

As mentioned at the very beginning, the sonotrode according to the invention can be configured for ablating hard or soft tissue.

It has been observed that oscillation amplitudes of the sharp rim of below 150 μm, in particular below 100 μm, for example between 40-80 μm, are most efficient for ablating hard tissue, in particular bone tissue.

The relevant oscillation amplitude is in particular the oscillation amplitude along an axis that is parallel to the longitudinal axis.

The oscillation amplitude is usually measured as distance between the two turning points.

In an embodiment, the sonotrode is configured to have an oscillation amplitude of the sharp rim during use of the sonotrode of 100 μm at most.

On the other hand, it has been observed that oscillation amplitudes of the sharp rim of more than 100 μm, in particular more than 150 μm or 200 μm, for example between 150-300 μm, are most efficient for ablating soft tissue. One reason why an oscillation amplitude of the sharp rim in this range are efficient for ablating soft tissue is that the soft tissue can no longer deform in a sufficient manner for not being ablated.

In an embodiment, the sonotrode is configured to have an oscillation amplitude of the sharp rim during use of the sonotrode of 150 μm or more.

However, a sonotrode for an ultrasonic surgical instrument material is usually of a material and design that oscillation amplitudes of more than 100 μm cannot be achieved by phonons, this means material stretching, only.

Hence, sonotrodes for ablating soft tissue include in embodiments means for increasing the oscillation amplitude of the sharp rim, in particular any means discussed above.

In particular, such sonotrodes can include at least one of a stem having the tapering region disclosed above ("boost effect"), an overall shape of the cap that favors the existence of an oscillation mode of the cap in any embodiment discussed above, in particular an oscillation mode that has its maximum amplitude at a most radial portion of the cap, and a region of the cap of reduced mechanical stability, in particular such that that a region including the sharp rim includes an "own" ("self-reliant") oscillation mode ("separate oscillator").

In contrast to this, sonotrodes for ablating hard tissue, in particular bone tissue, do not need means for increasing the oscillation amplitude of the sharp rim. This is because the oscillation amplitudes that can be achieved by phonons are sufficient for ablating hard tissue.

BRIEF DESCRIPTION OF THE DRAWINGS

Exemplary embodiments of device and method according to the invention are described in further detail in connection with the appended Figures.

FIG. 10 shows a schematic drawing of a variant of the exemplary embodiment according to FIG. 9.

FIG. 11 shows a detail view of the cap of the sonotrode according to FIG. 10.

FIG. 12a-12b shows a schematic drawing (FIG. 12a) of a sonotrode that is partly shielded by a sleeve and a cross-sectional view (FIG. 12b) thereof.

FIGS. 13-16 show schematic drawings of further exemplary embodiments of caps.

FIGS. 17-18 show schematic drawings of exemplary embodiments of the sonotrode including cooling and/or means for promoting the transport of debris away from the treatment location.

DESCRIPTION OF THE PREFERRED EMBODIMENTS

Figure 1:
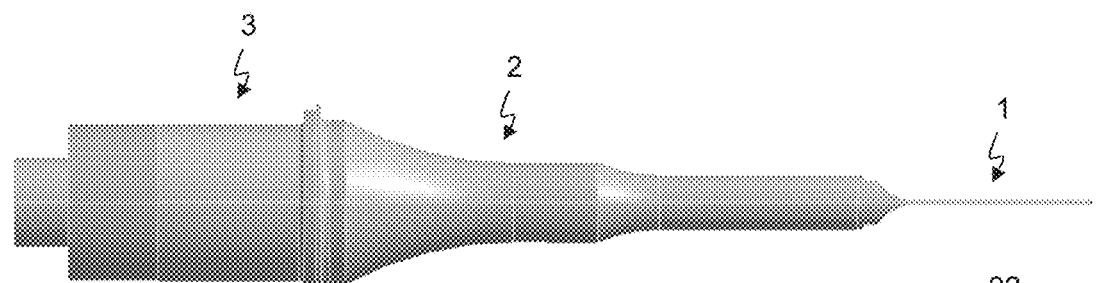
FIG. 1 shows the distal part of an ultrasonic surgical instrument for ablating tissue including a transducer located inside a housing with a sonotrode at the tip of the housing.

In all appended FIGS., same reference numerals designate same elements or similar elements serving same functions.

FIG. 1 shows the distal part of an ultrasonic surgical instrument for ablating tissue. The instrument includes a transducer 3, for example a piezoelectric stack, located inside a housing 2, and a sonotrode 1 arranged at the tip of the housing 2.

Figure 2:
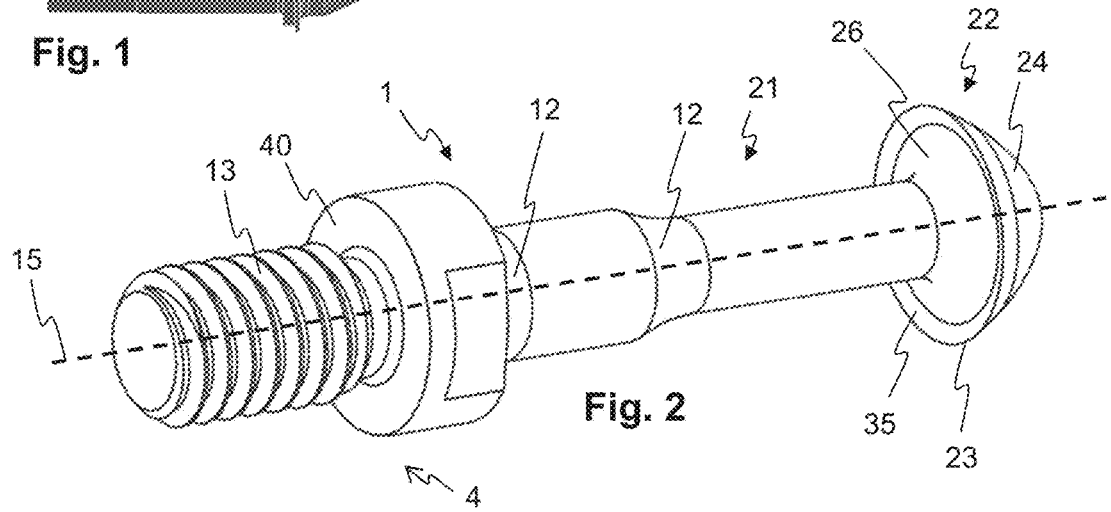
FIGS. 2 and 3 show schematic drawings of a first exemplary embodiment of an inventive sonotrode.
Figure 3:
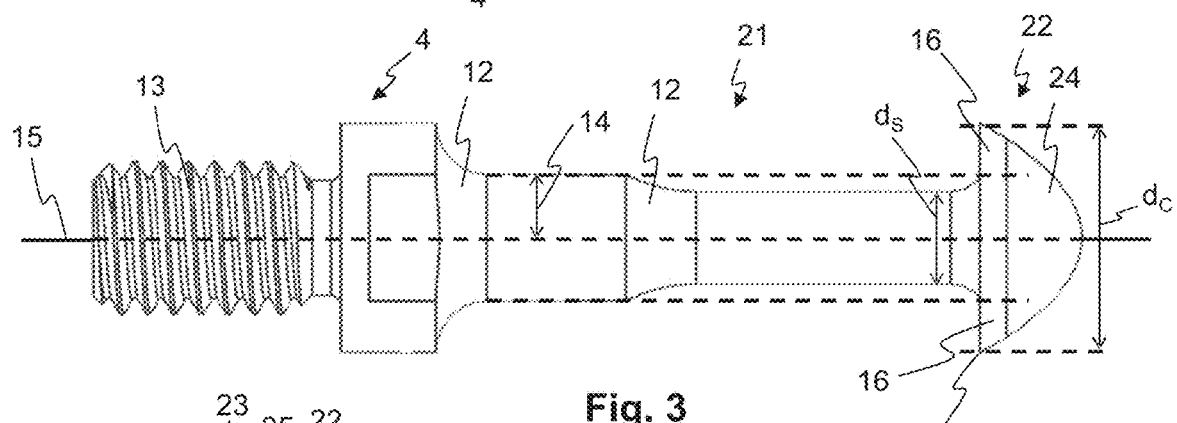

FIGS. 2 and 3 show two different views of a first exemplary embodiment of a sonotrode 1 according to the main aspect of the invention.

The sonotrode 1 has a proximal end 4 with a coupling element 13 (a thread 13 in the embodiment shown), a stem 21 and a cap 22. The cap 22 includes a convex shape 24 and at least one sharp rim 23. The cap is designed and suitable to ablate (scrap, rasp) tissue, such as unwanted bone structures such as osteophytes. The sharp rim(s) can be used to scrape or file away tissue whereas the surface of the convex shape 24 (convex surface, vaulted surface) is smooth and is formed to protect the tissue in the embodiment shown.

Figure 4:
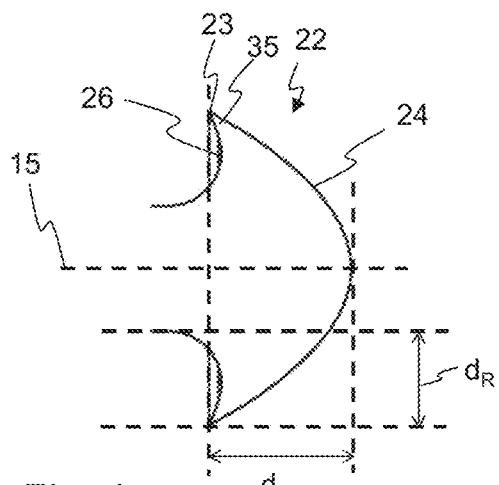
FIG. 4 shows a detail view of the cap of the sonotrode according to FIGS. 2 and 3.
Figure 5:
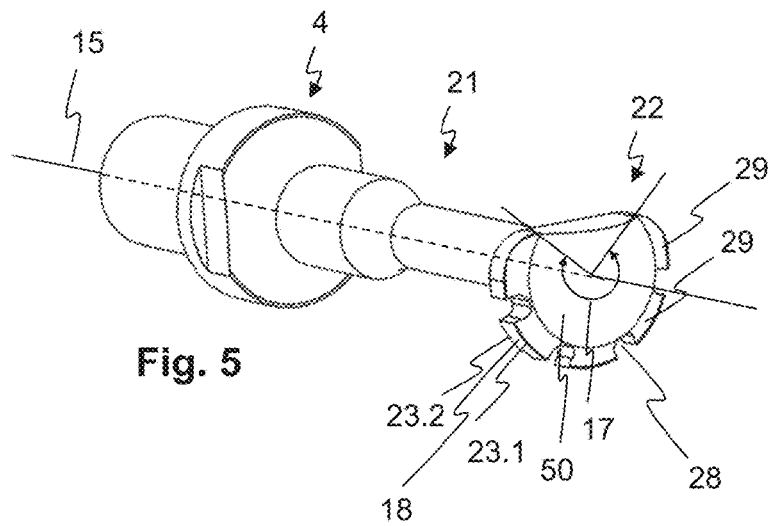
FIG. 5 shows a schematic drawing of a further exemplary embodiment of an inventive sonotrode.

FIG. 4 shows a detailed view of the cap 22 shown in FIGS. 4 and 5.

The sonotrode 1 extents along a longitudinal axis 15.

A flattening (tapering) area 12 of the proximal end 4 forms the transition between the proximal end 4 and the stem 21 in the embodiment shown in FIG. 2.

The flattening (tapering) area 12 reduces the diameter of a distal end of the proximal end 4 of the sonotrode to a preferred diameter of the stem 21. The diameter of the proximal end 4 may be determined by the coupling element 13 and/or by the need to provide a coupling-in surface 40 of the sonotrode 1.

A further flattening (tapering) area 12 is arranged within the stem 21. A flattening (tapering) area 12 arranged in this manner may serve as a "booster", this means it may increase the amplitude and intensity of the mechanical vibration distally of the flattening area 12 compared to the amplitude and intensity of the mechanical vibration proximally of the flattening area 12.

The cap 22 of the sonotrode includes a portion 16 that protrudes further in radial direction with respect to the longitudinal axis 15 than the stem 21.

More precisely, the cap 22 includes a portion 16 that is arranged more distant from the longitudinal axis 15 in a radial direction with respect to the longitudinal axis 15 than a maximal extension 14 of the stem 21 in radial direction with respect to the longitudinal axis 15. The portion 16 can be defined by the range of the longitudinal axis 15 at with the cap 22 extends more in radial direction than the maximal extension 14 of the stem 21 and by a range 19 of radial angles over which the portion 16 extends more in radial direction than the maximal extension 14 of the stem 21, the range 19 of radial angles being determined at at least one position in the range of the longitudinal axis 15.

The portion 16 that protrudes further in radial direction than the stem includes the sharp rim 23

The cap 22 of the embodiment shown in FIGS. 2 to 4 is rotation symmetric with respect to the longitudinal axis. This ensures that the center of mass 43 of the cap 22 is on the longitudinal axis 15.

In the embodiment shown, the cap is formed like a hat of a mushroom having a distally facing convex surface 24 and a proximally facing concave surface 26. The portion 16 that is protrudes further in radial direction than the stem 21 covers a range 19 of radial angles of 360 degrees.

The concave surface 26 bents towards proximally in its most radial region such that an overhang 35 is formed.

The sharp 23 rim of the cap 22 is formed by the transition between the distally facing convex surface 24 and the proximally facing concave surface 26.

Due to the orientation of the sharp rim 23 formed in this manner, the sonotrode 1 works most efficiently when moved towards proximally ("pulling mode"). Further, the probability to injure tissue that must not be injured is reduced because the sharp rim 23 is positioned distally of the tissue to be ablated and only tissue is ablated that is arranged between the sharp rim 23 and a portion of the sonotrode that protrudes further in radial direction than the sharp rim 23.

Further, any force vector generated by the sharp rim 23 during operation of the sonotrode 1 is directed towards the tissue to be ablated.

The design of the sonotrode 1 also a sharper rim 23 possible and improves transport of debris away from the treatment location.

The convex surface 24 can be soft and/or smooth to avoid injuries of tissue that must not be treated, for example during operation of the sonotrode or during insertion of the sonotrode.

Alternatively, the convex surface 24 can include a structure that is suitable for rasping tissue. For example, the convex surface 24 can be covered by a structure being between 100 and 120 μm in height. In other words, the cap of the sonotrode 1 shown in FIGS. 2-4 can be configured to ablate, for example to grind, also when moved towards distally ("pushing mode").

The cap 22 according to FIGS. 2 to 4 is designed to support a self-reliant oscillation mode that can be excited by longitudinal mechanical vibrations coupled into the cap via the stem 21. Besides an overall shape of the cap 22 that is in favor for supporting such an oscillation mode, the ratio between the diameter $d_S$ of the stem in a region adjacent to the onset of the cap 22 and the diameter $d_C$ of the cap as well as the ratio between the maximal extension $d_L$ of the cap in longitudinal direction and the maximal extension $d_R$ of the portion 16 that protrudes further in radial direction than the stem can be optimized for the cap 22 supporting an oscillation mode.

Figure 6:
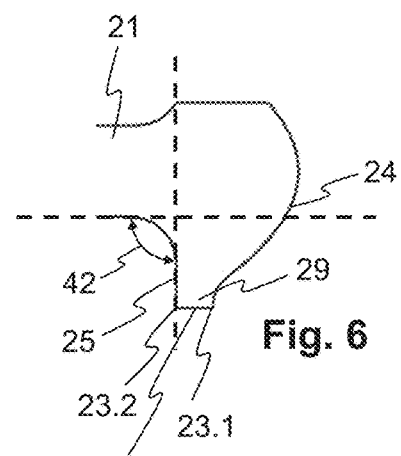
FIG. 6 shows a detail view of the cap of the sonotrode according to FIG. 5.
Figure 7:
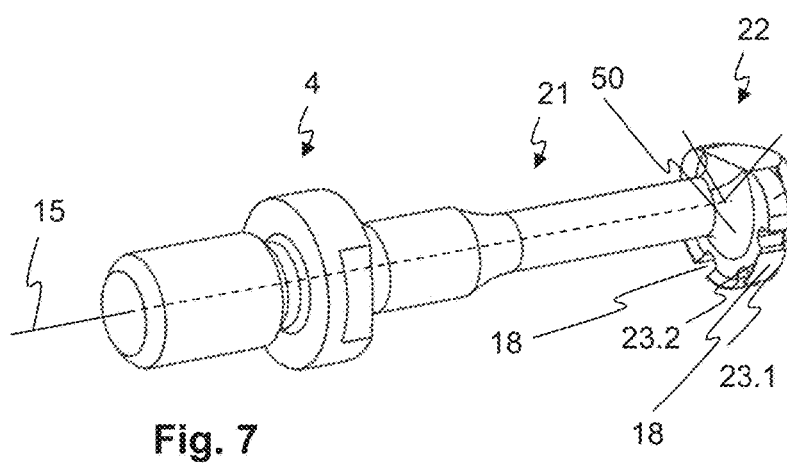
FIG. 7 shows a schematic drawing of a variant of the exemplary embodiment of FIGS. 5 and 6.
Figure 8:
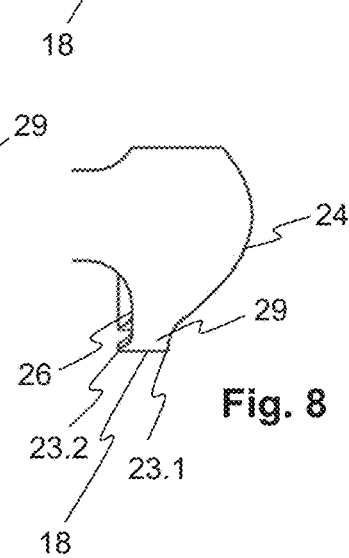
FIG. 8 shows a detail view of the cap of the sonotrode according to FIG. 7.

FIGS. 5-8 show further exemplary embodiments of a sonotrode 1 according to the invention, wherein FIG. 6 is a detail view of the cap 22 of the sonotrode 1 of FIG. 5 and FIG. 8 is a detail view of the cap 22 of the sonotrode 1 of FIG. 7.

In contrast to the embodiment shown in FIGS. 2-4, the sharp rim 23 is restricted to a range of radial directions (angles) in the embodiments of FIGS. 5-8. In other words, the cap 22 has a circumferential surface that includes the sharp rim 23 in a segment 17 of the circumferential surface only. The circumferential surface or at least the segment 17 of the circumferential surface including the sharp rim 23 is adapted to desired locations of treatment and non-treatment.

In the embodiments shown in FIGS. 5-8, the circumferential surface in the segment 17 including the sharp rim 23 includes further recesses 28 in the segment 17. This can improve transport of debris away from the treatment location, for example.

In other words, the sharp rim 23 of the cap 22 is formed by rim elements 29 arranged in the segment 17 of the circumferential surface to which the sharp rim 23 is restricted.

Two neighboring rim elements 29 are separated from each other by a recess 28.

The rim elements 29 shown in FIGS. 5-8 are further part of the portion 16 being arranged more distant from the longitudinal axis than the maximal extension 14 of the stem 21.

The rim elements 29 can act as individual (self-reliant) oscillators excited by the central region (the core) of the cap 22. In other words, each rim element 29 can show a vibration mode on its own. This allows for increased axial (proximal-to-distal) amplitudes and hence to an improved ablation performance of the sonotrode.

The cap 22 of the embodiments according to FIGS. 5-8 has further a first sharp rim 23.1 and a second sharp rim 23.2, the second sharp rim 23.2 being arranged more proximally with respect to the first sharp rim 23.1.

In the embodiments shown in FIGS. 5-8, the first and second sharp rims are formed by the transition between the distally facing convex surface 24 and a proximally facing surface of the mushroom-like shaped cap 22, wherein the transition is not a direct transition but a transition via a surface 18 having a surface normal that coincides essentially with a radial direction (radial with respect to the longitudinal axis). In the embodiments shown, the surface 18 having a surface normal that coincides essentially with a radial direction is formed essentially by portions of an imagined surface that surrounds the longitudinal axis, wherein each point on the imagined surface has the same distance from the longitudinal axis.

Thereby, the first sharp rim 23.1 is formed by the transition between the distally facing convex surface 24 and the surface 18 having a surface normal essentially along a radial direction and the second sharp rim 23.2 is formed by the transition between the surface 18 having a surface normal essentially along a radial direction and the proximally facing surface of the mushroom-like shaped cap 22.

In the embodiment of FIGS. 5 and 6, the proximally facing surface of the mushroom-like shaped cap 22 forms an essentially flat (planar) surface 25 in the region of the transition at least. The flat surface 25 runs at an opening angle 42 with respect to the stem 21 of 90 degrees.

In the embodiment of FIGS. 7 and 8, the proximally facing surface of the mushroom-like shaped cap 22 forms a concave surface 26 in the region of the transition at least. This can improve the sharpness of the second sharp rim 23.2 and it can improve transport of debris away from the treatment location. It can also be advantageous in terms of the force vector generated by the sharp rim 23.2 during operation of the sonotrode 1 as discussed above.

In particular the advantages of a sharper rim and of a more favorable force vector are more pronounced if the sharp rim (the second sharp rim 23.2 in the embodiment of FIGS. 7 and 8) is formed by an overhang 35 of the radially extending surface (the concave surface 26 or the convex surface 24 as shown in FIG. 14).

In order to fulfill the requirement of a center of mass 43 of the cap 22 that is on the longitudinal axis 15, the cap can include at least two sections being arranged in a manner that the cap includes an n-fold rotational symmetry around the longitudinal axis 15, wherein n is an integer but not 1, and/or the cap 22 can include an equalizing weight (equalizing mass) 41 as shown in FIGS. 15 and 16, for example.

In the embodiment of FIGS. 7 and 8, the concavity of concave surface 26 is moderate only. However, the concavity may be much more pronounced.

A more pronounced concavity is shown exemplarily in the embodiment of FIG. 13, where the concavity is such that a whole radial end portion of the cap 22 is an overhang 35 and not only the sharp rim 23. Further, the concavity of the concave surface 26 is more pronounced that the convexity of the convex surface 24. This means that the extension of the cap in longitudinal direction (the longitudinal extension $d_L$) depends on the distance r from the longitudinal axis 15 and includes a minimum between the longitudinal axis and the position of the sharp rim(s) 23.

The region of minimum in the extension of the cap 22 in longitudinal direction can be considered as a region of reduced mechanical stability 37.

The most radial portion of the cap 22 can act as individual (self-reliant) oscillators excited by the central region (the core) of the cap 22, if the cap is designed according to FIG. 13. In other words, the most radial portion of the cap 22 can show a vibration mode on its own, wherein the vibration mode will also have a movement component in radial direction. This can further improve ablation due to the generation of a hammering effect. However, the vibration in radial direction of the most radial portion is not accompanied by a significant excitation of a transversal oscillation mode of the whole sonotrode 1 if the cap 22 includes an n-fold rotational symmetry with respect to the longitudinal axis 15, wherein n is an integer but not 1, in particular an even number or if the cap 22 is rotationally symmetric around the longitudinal axis (i.e. a rotation by any angle transfers the cap into itself). These symmetry considerations also mean that a center of mass 43 of the cap is on the longitudinal axis.

The most radial portion that can act as an individual (self-reliant) oscillator due to minimum of extension in longitudinal direction usually has oscillation modes with an oscillatory movement that includes a significant direction in radial and longitudinal direction. Hence, the oscillation mode of the most radial portion effects both the hammering effect and an increased axial (proximal-to-distal) amplitude. The combination of hammering effect and increased axial amplitude increases the ablation efficiency of the sonotrode significantly.

Figure 9:
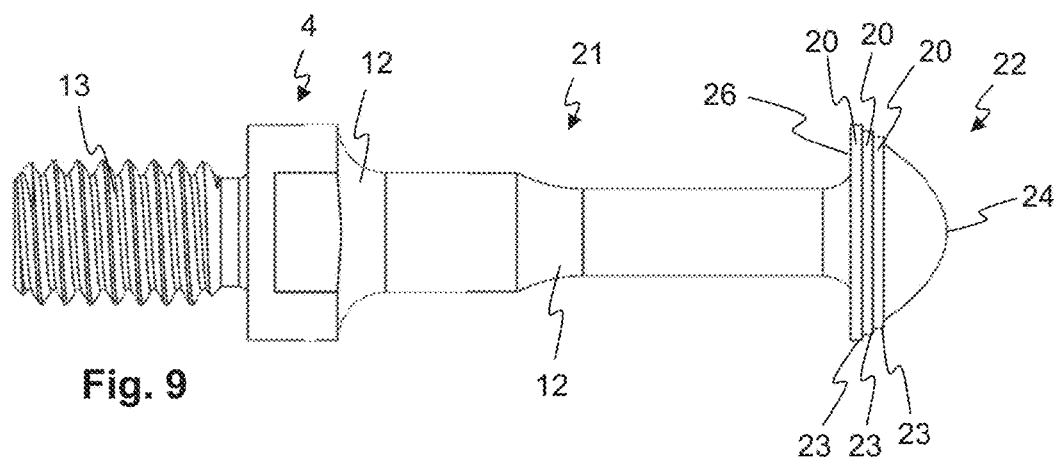
FIG. 9 shows a schematic drawing of yet a further exemplary embodiment of an inventive sonotrode.

FIG. 9 shows a further exemplary embodiment of a sonotrode 1 according to the invention. The embodiment includes a plurality (this means at least two) sharp rims 23, wherein the sharp rims are offset with respect to each other along a distal-to-proximal direction. The distal-to-proximal direction runs usually parallel to the longitudinal axis 15 of the sonotrode 1.

In the embodiment shown in FIG. 9, the plurality of sharp rims 23 is formed by a sequence of steps 20 arranged at the most radial portion of the cap 22. In the embodiment shown, the cap 22 includes the distally facing convex surface 24 and the steps 20 are arranged proximally of the convex surface 24. Each step forms a sharp rim 23 by including a transition from a surface that is oriented essentially along a radial direction and a surface that is oriented essentially along the distal-to-proximal direction.

The steps 20 are further offset in their distance from the longitudinal axis 15. In the embodiment shown in FIG. 9, the offset is such that the sharp rim 23 formed by a step 20 is more distant from the longitudinal axis 15 than its distal neighboring step 20 and sharp rim 23 of that distal neighboring step 20. Thereby, the plurality of sharp rims 23 contribute to ablating in a movement of the sonotrode 1 in distal direction, this means in a pushing movement.

Alternatively, the offset can be such that the sharp rim 23 formed by a step 20 is more distant from the longitudinal axis 15 than its proximal neighboring step 20 and the sharp rim of that proximal neighboring step 20. Thereby, the plurality of sharp rims 23 contribute to ablating in a movement of the sonotrode 1 in proximal direction, this means in a pulling movement.

Alternatively, the steps can form a serrated surface. In this embodiment, two protruding steps are separated by a recess. Thereby, each protruding steps forms two sharp rims that are offset along the distal-to-proximal direction. Thereby, one half of the plurality of sharp rims 23 contributes to ablate in a movement of the sonotrode 1 in distal direction, this means in a pushing movement, and the other half of the plurality of sharp rims 23 contributes to ablate in a movement of the sonotrode 1 in proximal direction, this means in a pulling movement.

The cap 22 can have one or more further sharp rims besides the sharp rims formed by the steps. For example, a transition from a distally facing surface, in particular the convex surface 24 (if present) in any embodiment discussed to a step 20 and/or a transition of a step 20 to a proximally facing surface, such as the concave surface 26 in any embodiment discussed or the flat surface 25 in any embodiment discussed may form a further sharp rim.

One can envisage to replace the sequence of steps 20 by other elements that are formed to provide the plurality of sharp rims (23), in embodiments. For example, the steps may be replaced by ablative structures such as pyramids, crossed protrusions and/or a surface roughness. The surface roughness can be provided by the additive manufacturing methods discussed above or by selective laser melting (SLM), for example.

FIGS. 10 and 11 show yet a further exemplary embodiment of a sonotrode 1 according to the invention. FIG. 11 is a detail view of the cap 22 of the sonotrode 1 of FIG. 12. The embodiment shown in FIGS. 10 and 11 is similar to the embodiment including steps 20 that form a serrated surface.

In the embodiment of FIGS. 10 and 11, a serrated surface 34 is formed by a tapered structure forming a sharp rim 23, wherein a plurality of tapered structures is arranged along a distal-to-proximal direction.

For example, the cap 22 can include a surface, in particular a surface of the portion 16 that is arranged more distant from the longitudinal axis 15 than a maximal extension 14 of the stem 21, the surface having a surface normal that coincides essentially with a radial direction but that has protrusions and recesses such that a serrated surface 34 is formed. In the embodiment shown, the surface having a surface normal that coincides essentially with a radial direction is a surface surrounding the longitudinal axis, wherein each point on that surface would have the same distance from the longitudinal axis if the surface were not serrated.

Again, the cap can have one or more further sharp rims besides the sharp rims formed by the serrated surface 34. For example, a transition from a distally facing surface, for example the convex surface 24 (if present) in any embodiment discussed, to the serrated surface 34 and/or a transition from the serrated surface 34 to the a proximally facing surface, such as the concave surface 26 in any embodiment discussed or the flat surface 25 in any embodiment discussed may form a further sharp rim.

The cap 22 of any embodiment disclosed with respect to FIGS. 2-4 and 9-11 can be formed to define locations of treatment and non-treatment, for example as disclosed with respect to FIGS. 5-8.

In addition or alternatively to a cap 22 configured to define locations of treatment and non-treatment, a sleeve 30 as shown exemplarily in FIGS. 12a and 12b can be provided. FIG. 12a shows a schematic drawing of an exterior view of a sonotrode 1 including the sleeve 30. FIG. 12b shows a cross-sectional view of the sonotrode 1 including the sleeve 30 according to FIG. 12a.

The sonotrode 1 shown in FIGS. 12a and 12b in combination with the sleeve 30 is the sonotrode according to FIGS. 2-4. However, any sonotrode according to the main or secondary aspect of the invention can include a sleeve as shown exemplarily in FIGS. 12a and 12b. In particular, this is the case if the sonotrode includes the distally facing convex surface 24.

The sleeve 30 is configured to host at least a portion of the sonotrode 1 and to be mounted to the sonotrode 1 and/or to the ultrasonic surgical instrument.

The portion of the sonotrode 1 that is hosted in the sleeve 30 when the sleeve 30 is mounted to the sonotrode 1 includes the stem 21, in the embodiment shown.

The sleeve 30 can be mounted to the sonotrode 1 at its proximal end 4, for example at a distal portion of the coupling element 13.

The sleeve 30 includes a lateral opening 31 that is designed in a manner that the sharp rim 23 is not covered by the sleeve 30 in a section of action. In other words, the lateral opening 31 is designed in a manner that a portion of the sharp rim 23 is exposed when the sleeve 30 and the sonotrode 1 are mounted to the ultrasonic surgical instrument for use.

A sleeve 30 as shown exemplarily in FIGS. 12a and 12b is in particular advantageous in combination with sonotrodes 1 including means for providing a coolant and/or irrigation fluid to the treatment location and/or removal of debris, for example as shown in FIGS. 17 and 18.

FIG. 17 shows an exemplary embodiment of the sonotrode 1 including means for providing a coolant and/or irrigation fluid to the treatment location and/or removal of debris by including a central channel 46 that is open towards distally of the sonotrode 1.

In other words, the sonotrode 1 includes a central channel 46 through which a liquid, in particular a coolant and/or irrigation fluid, can be provided to a region distally of the sonotrode 1.

In addition or alternatively, the central channel 46 can be used to suck away liquid and debris from the region around the treatment location.

The combination of a sonotrode 1 including a central channel 46 as shown exemplarily in FIG. 17 with a sleeve 30 is in particular advantageous in medical cases in which the spatial conditions cause flooding of the treatment location, this means when the treatment location is in a confined area as it is the case in Minimal Invasive Surgery (MIS) applications.

FIG. 18 shows an exemplary embodiment of the sonotrode 1 including means for providing a coolant and/or irrigation fluid to the treatment location and/or removal of debris by including a lateral channel 47 that is open to a region arranged proximally of the sharp rim 23 and hence of the treatment location.

The sonotrode 1 according to the embodiment of FIG. 18 includes two lateral channels 47.

In other words, the sonotrode 1 includes two later channels 47, that are connected to a central supply channel 48 in the embodiment shown, through which a liquid, in particular a coolant and/or irrigation fluid, can be provided to a region proximally of the sharp rim 23.

In addition or alternatively, the lateral channel(s) 47 can be used to suck away liquid and debris from the region around the treatment location, in particular from the region between the sharp rim 23 and an opening 49 of the lateral channel 47.

In the embodiment shown in FIG. 18, the lateral channels 47 open in the flattening (tapering) area 12 of the proximal end 4 of the sonotrode 1. However, the lateral channels 47 can open anywhere in the stem 21 or the cap 22, in particular if the sonotrode 1 is used in combination with a sleeve 30.

In particular in embodiments of the sonotrode 1 including a lateral channel 47 and a sleeve 30, the orientation of the opening 49 of the lateral channel 47 is of minor importance.

For example, the lateral channels 47 can open in the further flattening (tapering) area 12 arranged within the stem 21.

The combination of a sonotrode 1 including a lateral channel 47 as shown exemplarily in FIG. 18 with a sleeve 30 is in particular advantageous in "open" medical cases in which the spatial conditions in the region of the treatment location do not or not sufficiently contribute to a flooding of the treatment location. In such cases, the sleeve 30 guides the liquid to be provided towards the treatment location, this means towards distally in the embodiment shown in FIG. 18, or it guides the liquid/debris to be sucked away from the treatment location towards the opening of the lateral channel 47, for example.

The means for providing a coolant and/or irrigation fluid to the treatment location and/or removal of debris, for example as shown in FIGS. 17 and 18, are preferably arranged in a manner that the oscillation behavior of the sonotrode 1 is altered due to the means. In the embodiment of FIG. 17, this is done by the central channel running along the central axis 15 of the sonotrode. In the embodiment of FIG. 18, this is done by arranging the lateral channels in a manner that the sonotrode still has a n-fold rotational symmetry at least, wherein n is an integer but not 1.

The means for cooling and/or removal disclosed with respect to FIGS. 17 and 18 can be present in any embodiment of the sonotrode 1 according to the main or secondary aspect of the invention.

FIGS. 13 to 16 show schematic drawings of further exemplary embodiments of caps 22 according to the invention.

The embodiment of FIG. 13 including a region of reduced mechanical stability 37 and a most radial portion of the cap 22 that acts as an individual (self-reliant) oscillators was discussed above with the embodiment according to FIGS. 7 and 8.

The portion 16 that protrudes further in radial direction than the stem 21 of the cap 22 according to the exemplary embodiment of FIG. 14 includes a first overhang 35.1 that forms a distal region of the portion 16 and a first sharp rim 23.1. The portion 16 includes further a second overhang 35.2 that forms a proximal region of the portion 16 and a second sharp rim 23.1.

A portion 16 that protrudes further in radial direction than the stem 21 that is designed in this manner has various advantage. For example and as discussed with respect to FIGS. 7 and 8, the sharpness of the rims can be improved, the transport of debris away from the treatment location can be improved, and the force vector generated by the sharp rims during operation of the sonotrode 1 is advantageous.

Further, a sonotrode including a cap 22 as shown exemplarily in FIG. 14 can ablate in pushing mode (i.e., the sonotrode is moved towards distally) and in pulling mode (i.e., the sonotrode is moved towards proximally).

Due to these advantages of a sonotrode having a first sharp rim 23.1 being arranged in a distal direction and a second sharp rim 23.2 being arranged in a proximal direction, the cap and sonotrode according to any embodiment disclosed can have such a first and second sharp rim, for example formed by overhangs 35 as shown exemplarily in FIG. 14.

FIGS. 15 and 16 show exemplary embodiments of the sonotrode including an equalizing weight (equalizing mass) 41 arranged in a manner that the center of mass 43 of the cap 22 is on the longitudinal axis 15.

In the embodiment according to FIG. 15, the equalizing weight 41 is arranged within the cap 22, this means that the equalizing weight 41 has no influence on the overall shape of the cap.

The equalizing weight 41 of the embodiment of FIG. 15 is a region of a density that is larger than the density of the remaining cap 22. The region has a center of mass 45 that is arranged in a manner that it compensates for a portion 16 protruding further in radial direction than the stem 21 and shifting the center of mass 43 of the cap away from the longitudinal axis 15.

In other words, any structural deviation of the cap that causes the cap to not having its center of mass 43 on the longitudinal axis 15 is compensated by a related equalizing weight 41 such that the overall center of mass 43 is on the longitudinal axis 15.

FIG. 16 shows an exemplary embodiment of an alternative of the concept of equalizing weights (equalizing masses) 41. According to this alternative, the equalizing weight 41 is arranged outside a basic shape of the cap 22.

For example, the equalizing weight 41 to a structural deviation of the cap causing the cap to not have its center of mass 43 on the longitudinal axis 15, in particular the portion 16 including the sharp rim 23, is a structural deviation of equal or similar shape as the structural deviation but arranged on the opposite side of the cap 22.

In embodiments, the equalizing weight 41 is a further portion 16 that protrudes further in a radial direction than the stem 21 with or without sharp rim 23.

FIG. 16 shows further the optional feature of a region of reduced mechanical stability 37 that includes an elastic element 38. The elastic element can improve the oscillatory behavior of a portion of the cap 22 that acts as an individual (self-reliant) oscillator as described with respect to FIG. 13, for example. This also means that any individual (self-reliant) oscillator disclosed can be connected to the rest of the sonotrode via an elastic element 38.

Figure 19:
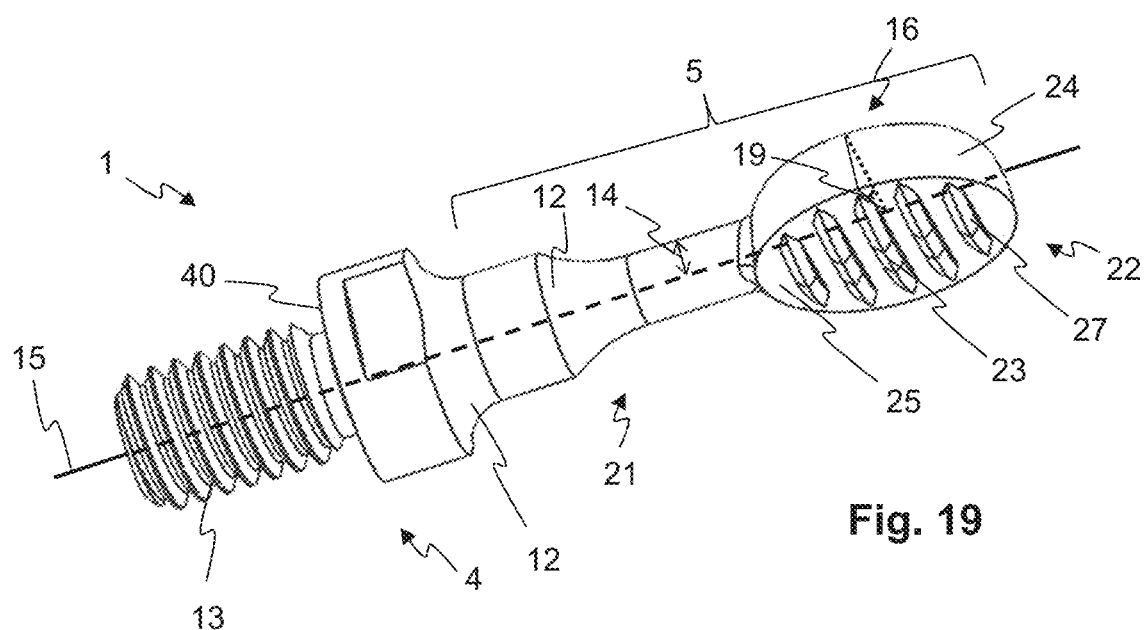
FIG. 19 shows a schematic drawing of an exemplary embodiment of a sonotrode according to the secondary aspect of the invention.

FIG. 19 shows an exemplary embodiment of a sonotrode 1 that is according to the secondary aspect of the invention.

The sonotrode shown in FIG. 19 fulfills some important requirements to a sonotrode for ablating tissue, such as bone tissue, for example mechanical stability, restriction and controllability of the treatment location, ability to ablate during forward and backward movement, and—to some extend at least, suppression of the excitation of lateral oscillation modes. Hence, the sonotrode shown in FIG. 19 includes a plurality of features that are present or may be present in sonotrodes according to the main aspect of the invention.

The sonotrode 1 shown in FIG. 19 has a proximal end 4 with a thread 13, and a distal end piece 5 with a stem 21 and a cap 22. The cap 22 includes a convex shape 24 and at least one sharp rim 23. The cap 22 is designed and suitable to ablate or scrap tissue, such as unwanted bone structures such as osteophytes. The sharp rim(s) can be used to scrape or file away tissue whereas the surface of the convex shape 24 (convex surface, vaulted surface) is smooth and is formed to protect the tissue.

Also to sonotrode 1 according to the secondary aspect extents along a longitudinal axis 15.

The sonotrode 1 shown includes the optional feature of a flattening (tapering) area 12 of the proximal end 4 that forms the transition between the proximal end 4 and the stem 21 as discussed above. It includes further the optional feature of a further flattening (tapering) area 12 arranged within the stem as discussed above.

In the sonotrode disclosed in FIG. 19 the portion 16 that is arranged more distant from the longitudinal axis 15 than the maximal extension 14 of the stem 21 extends over a significant range 19 of radial angles. This means that the sonotrode includes a portion 16 having a radial extension with respect to the longitudinal axis that is larger than the maximal distance and that extends over a significant range 19 of radial angles. In particular, an extension over a range 19 of radial angles is significant if the resulting cap 22 is not blade-like.

In the embodiment shown in FIG. 19, the range 19 of radial angles is larger than 20 degrees.

Also, the embodiment according to the secondary aspect includes at least one sharp rim 23 or at least a portion of a sharp rim arranged in the portion 16 that is arranged more distant from the longitudinal axis 15 than a maximal extension 14 of the stem 21 (i.e. that protrudes further in a radial direction than the stem 21) and that extends over a significant range 19 of radial angles.

The cap 22 according to FIG. 19 includes an essentially flat surface 25 that includes protruding ribs 27 having sharp rims 23. The surface portions of the cap 22 that are different from the flat surface 25 form the convex shape (surface) 24 of the cap 22 (except in the region of the stem 21). These surface portions are smooth.

The cap 22 according to FIG. 19 can be massive. This means that an interior of the cap 22, the interior being defined by the essentially flat surface 25 and the convex surface 24, can be filled with material, in particular "filled" with the material forming the surface of the cap 22.

Figure 20:
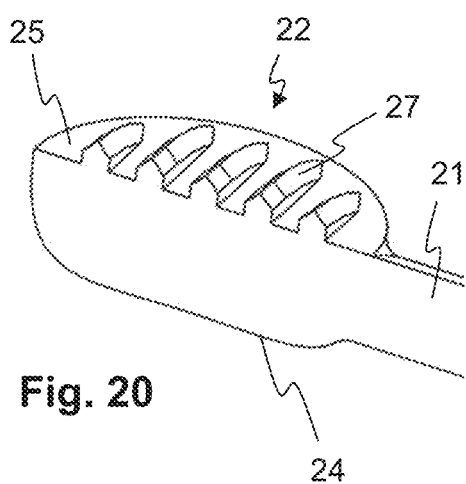
FIG. 20 shows a detail view of the cap of the sonotrode according to FIG. 19.

FIG. 20 shows a detailed view of the cap 22 according to FIG. 19 and having a massive cap 22.

Alternatively, the cap 22 according to FIG. 19 can be formed like a spoon, this means having a convex surface 24 with a non-filled interior. Ribs 27 can be located within this convex surface (or spoon) or can bridge opposite rims of the convex surface 24. These ribs can have sharp rims 23 which may be elevated in respect to the rim of the spoon like structure.

The portion 16 that is arranged more distant from the longitudinal axis 15 in a radial direction than the maximal extension 14 of the stem 21 includes the portions of the (filled or non-filled) spoon-like shape of the cap 22 that are most distant from the longitudinal axis 15 in the embodiment of FIGS. 19 and 20.

What is claimed is:

1. A sonotrode for an ultrasonic surgical instrument, the sonotrode comprising a stem extending along a longitudinal axis and a cap configured to carry out an ablative process on tissue using mechanical oscillation, wherein the cap comprises at least one portion that protrudes further in a radial direction than the stem, wherein the at least one portion comprises at least one sharp rim, wherein the cap has a surface arranged between a distal end of the stem and the sharp rim of the at least one portion, wherein the surface is concave and/or runs at an opening angle with respect to the stem that is equal to or smaller than 90 degrees, wherein the cap comprises a convex surface, wherein the convex surface provides a soft and/or smooth surface, and wherein each of the at least one portion protruding further in the radial direction than the stem has over a range of radial angles larger than 160 degrees a radial extension that is larger than a maximal radial extension of the stem with respect to the longitudinal axis.

2. The sonotrode according to claim 1, wherein the surface of the cap arranged between the distal end of the stem and the sharp rim is concave and is bent in proximal direction to an extent that the portion comprises an overhang.

3. The sonotrode according to claim 1, wherein the cap comprises at least one oscillation mode that can be excited by mechanical oscillations coupled into the cap via the stem.

4. The sonotrode according to claim 3, wherein the sonotrode comprises at least one of:
a diameter of the stem in a region adjacent to the onset of the cap is at most half of a related diameter of the cap;
a largest possible circle that can be arranged completely within a cross-section of the stem, said cross-section being perpendicular to the longitudinal axis and being in a region of the stem adjacent to the onset of the cap, has a diameter that is at most half the diameter of the smallest possible circle that can enclose the cap in a cross-section perpendicular to the longitudinal axis, wherein said cross-section of the cap is at the position of maximal lateral extension of the cap;
a maximal extension of the cap in longitudinal direction is at most half of a maximal extension of the portion that protrudes further in radial direction than the stem in radial direction;
the longitudinal extension of the cap depends on the distance from the longitudinal axis, wherein the longitudinal extension comprises a minimum between the longitudinal axis and the sharp rim.

5. The sonotrode according to claim 1, wherein the sonotrode comprises a coupling element that is coupled to a transducer, wherein the sonotrode is optimized for a preset frequency of mechanical oscillations by having a distance between the coupling element and the cap being half of the wavelength of the preset frequency or a multiple of half of the wavelength of the preset frequency.

6. The sonotrode according to claim 1, wherein the cap comprises at least two portions that protrude further in radial directions than the stem.

7. The sonotrode according to claim 1, wherein the sharp rim is formed by at least one of:
a transition from the convex surface to the surface that is concave or that runs at an opening angle with respect to the stem that is equal or smaller than 90 degrees;
a transition from a first surface that is flat, concave or convex to a second surface that is flat, concave or convex, wherein the first and second surfaces are oriented differently; and
protrusions of a convex, flat or concave surface.

8. The sonotrode according to claim 1, wherein the sharp rim is arranged on a radially outermost portion of the cap.

9. The sonotrode according to claim 1, wherein the sharp rim is arranged in a segment, only.

10. The sonotrode according to claim 1, wherein the sharp rim is formed by a plurality of rim elements.

11. The sonotrode according to claim 1, wherein the sonotrode comprises at least two sharp rims that are offset along a proximal-to-distal direction.

12. The sonotrode according to claim 1, wherein the stem has a tapering region.

13. The sonotrode according to claim 1, wherein an oscillation amplitude of the sharp rim during use of the sonotrode is equal to or greater than 150 µm.

14. The sonotrode according to claim 1, wherein the sonotrode comprises at least one of:
the stem having a tapering region;
the cap comprising at least one region comprising the sharp rim and being connected to a body of the cap via a region of the cap having reduced mechanical stability;
the cap comprising at least one oscillation mode that can be excited by mechanical oscillations coupled into the cap via the stem.

15. The sonotrode according to claim 1, wherein the sonotrode is configured for Minimal Invasive Surgery by comprising a stem having a length corresponding to half of a wavelength of a preset frequency of mechanical oscillations or a multiple of half of the wavelength of the preset frequency of mechanical oscillations and a sleeve arranged or configured to be arranged around the stem such that the stem is shielded from an exterior of the sleeve.

16. The sonotrode according to claim 1, wherein a surface of the sonotrode has a roughness average of between 5-15 µm.

17. The sonotrode according to claim 1, wherein the sonotrode comprises a sleeve arranged or configured to be arranged to laterally surround the stem such that the stem is shielded from an exterior of the sleeve and such that the sharp rim is exposed to a lateral direction.

18. The sonotrode according to claim 1, wherein the sonotrode comprises a channel for providing a fluid to a treatment location and/or for removing a fluid and/or debris from the treatment location.

19. A sonotrode for an ultrasonic surgical instrument, the sonotrode comprising a stem extending along a longitudinal axis and a cap configured to carry out an ablative process on tissue using mechanical oscillation, wherein the cap comprises at least one portion that protrudes further in a radial direction than the stem, wherein the at least one portion comprises at least one sharp rim, wherein a surface of the cap, said surface being arranged between a distal end of the stem and the sharp rim of the portion, is a concave surface and/or runs at an opening angle with respect to the stem that is equal or smaller than 90 degrees, and wherein the cap comprises a convex surface, wherein the convex surface provides a soft and/or smooth surface, wherein the at least one portion protruding further in a radial direction than the stem has over a range of radial angles of 360 degrees a radial extension that is larger than a maximal radial extension of the stem with respect to the longitudinal axis, wherein the sharp rim is arranged only within a limited range of radial angles of the portion protruding further in the radial direction than the stem.

20. A sonotrode for an ultrasonic surgical instrument, the sonotrode comprising a stem extending along a longitudinal axis and a cap configured to carry out an ablative process on tissue using mechanical oscillation, wherein the cap comprises at least one portion that protrudes further in a radial direction than the stem, wherein the at least one portion comprises at least one sharp rim, wherein a surface of the cap, said surface being arranged between a distal end of the stem and the sharp rim of the portion, is a concave surface and/or runs at an opening angle with respect to the stem that is equal to or smaller than 90 degrees, and wherein the cap comprises a convex surface, wherein the convex surface provides a soft and/or smooth surface, and wherein the cap comprises at least one region comprising the sharp rim and being connected to a body of the cap via a region of the cap of reduced mechanical stability.

\* \* \* \* \*